(12) United States Patent
Audet et al.

(10) Patent No.: US 9,519,693 B2
(45) Date of Patent: Dec. 13, 2016

(54) METHOD AND APPARATUS FOR DISPLAYING DATA ELEMENT AXES

(71) Applicants: Mathieu Audet, Montreal (CA); Francois Cassistat, Montreal (CA)

(72) Inventors: Mathieu Audet, Montreal (CA); Francois Cassistat, Montreal (CA)

(73) Assignee: 9224-5489 QUEBEC INC., Montreal (CA)

( * ) Notice: Subject to any disclaimer, the term of this patent is extended or adjusted under 35 U.S.C. 154(b) by 586 days.

(21) Appl. No.: 13/804,637

(22) Filed: Mar. 14, 2013

(65) Prior Publication Data

US 2013/0332453 A1 Dec. 12, 2013

Related U.S. Application Data

(60) Provisional application No. 61/658,171, filed on Jun. 11, 2012.

(51) Int. Cl.
*G06F 7/00* (2006.01)
*G06F 17/30* (2006.01)

(52) U.S. Cl.
CPC ... *G06F 17/30554* (2013.01); *G06F 17/30572* (2013.01)

(58) Field of Classification Search
None
See application file for complete search history.

(56) References Cited

U.S. PATENT DOCUMENTS

| 4,616,336 A | 10/1986 | Robertson |
|---|---|---|
| 4,653,021 A | 3/1987 | Takagi |
| 4,817,036 A | 3/1989 | Millet et al. |
| 5,115,504 A | 5/1992 | Belove |
| 5,148,154 A | 9/1992 | MacKay |
| 5,241,624 A | 8/1993 | Torres |
| 5,261,087 A | 11/1993 | Makaino |
| 5,388,197 A | 2/1995 | Rayner |
| 5,398,074 A | 3/1995 | Duffield |
| 5,414,811 A | 5/1995 | Parulski et al. |

(Continued)

FOREIGN PATENT DOCUMENTS

| CA | 2323268 | 10/2000 |
|---|---|---|
| EP | 2568369 | 3/2013 |

(Continued)

OTHER PUBLICATIONS

Bui et al., "TimeLine: Visualizing Integrated Patient Records", IEEE Transactions on Information Technology in Biomedicine, vol. 11, No. 4, Jul. 2007, IEEE.*

(Continued)

*Primary Examiner* — Michael Hicks
(74) *Attorney, Agent, or Firm* — Mathieu Audet

(57) ABSTRACT

An aspect of the invention hereby presented provides a means to display a first set of, for instance, documents in conjunction with a second set of documents when the second set of documents would not necessarily fit in the query used to select the documents of the first set of documents and/or would not necessarily fit the collation of the first set of documents. The second set of documents so located in relationship with the first set of documents having a beneficial effect for the understanding of the first set of documents. A system and a GUI thereof is also hereby presented.

20 Claims, 21 Drawing Sheets

(56) References Cited

U.S. PATENT DOCUMENTS

| | | | |
|---|---|---|---|
| 5,499,330 A | 3/1996 | Lucas et al. | |
| 5,519,828 A * | 5/1996 | Rayner | G11B 27/34 |
| | | | 715/723 |
| 5,524,195 A | 6/1996 | Clanton | |
| 5,535,063 A | 7/1996 | Lamming | |
| 5,537,524 A | 7/1996 | Aprile | |
| 5,546,528 A | 8/1996 | Johnston | |
| 5,581,752 A | 12/1996 | Inoue | |
| 5,598,519 A | 1/1997 | Narayanan | |
| 5,602,596 A | 2/1997 | Claussen | |
| 5,606,374 A | 2/1997 | Bertram | |
| 5,621,456 A | 4/1997 | Florin | |
| 5,621,874 A | 4/1997 | Lucas | |
| 5,623,613 A | 4/1997 | Rowe | |
| 5,634,064 A | 5/1997 | Warnock | |
| 5,649,182 A | 7/1997 | Reitz | |
| 5,659,742 A | 8/1997 | Beattie | |
| 5,663,757 A | 9/1997 | Morales | |
| 5,671,381 A | 9/1997 | Strasnick | |
| 5,673,401 A | 9/1997 | Volk | |
| 5,677,708 A | 10/1997 | Mattews | |
| 5,680,605 A | 10/1997 | Torres | |
| 5,682,511 A | 10/1997 | Sposato | |
| 5,689,287 A | 11/1997 | Mackinlay | |
| 5,701,500 A | 12/1997 | Ikeo | |
| 5,713,031 A | 1/1998 | Saito | |
| 5,740,815 A | 4/1998 | Alpins | |
| 5,751,280 A | 5/1998 | Abbott | |
| 5,781,188 A | 7/1998 | Amiot | |
| 5,781,785 A | 7/1998 | Rowe | |
| 5,794,178 A | 8/1998 | Caid | |
| 5,798,766 A | 8/1998 | Hayashi et al. | |
| 5,812,124 A | 9/1998 | Eick | |
| 5,822,751 A | 10/1998 | Gray | |
| 5,832,504 A | 11/1998 | Tripathi | |
| 5,838,317 A | 11/1998 | Bolnick | |
| 5,838,326 A | 11/1998 | Card | |
| 5,838,966 A * | 11/1998 | Harlan | G06F 17/30643 |
| | | | 707/999.1 |
| 5,847,707 A | 12/1998 | Hayashida | |
| 5,850,218 A | 12/1998 | Lajoie | |
| 5,878,410 A | 3/1999 | Zbikowski | |
| 5,900,879 A | 5/1999 | Berry | |
| 5,903,271 A | 5/1999 | Bardon | |
| 5,905,992 A | 5/1999 | Lucas | |
| 5,920,859 A | 7/1999 | Li | |
| 5,926,824 A | 7/1999 | Hashimoto | |
| 5,933,843 A | 8/1999 | Takai | |
| 5,974,391 A | 10/1999 | Hongawa et al. | |
| 5,977,974 A | 11/1999 | Hatori et al. | |
| 5,980,096 A | 11/1999 | Thalhammer-Reyero | |
| 5,982,369 A * | 11/1999 | Sciammarella | G06F 17/30696 |
| | | | 345/440 |
| 6,003,034 A * | 12/1999 | Tuli | G06F 17/30067 |
| 6,005,601 A | 12/1999 | Ohkura | |
| 6,006,227 A | 12/1999 | Freeman | |
| 6,009,442 A | 12/1999 | Chen | |
| 6,012,072 A | 1/2000 | Lucas | |
| 6,020,930 A | 2/2000 | Legrand | |
| 6,023,703 A | 2/2000 | Hill | |
| 6,028,600 A | 2/2000 | Rosin | |
| 6,029,164 A | 2/2000 | Birrell | |
| 6,037,933 A | 3/2000 | Blonstein | |
| 6,038,522 A | 3/2000 | Manson et al. | |
| 6,061,062 A | 5/2000 | Venolia | |
| 6,064,384 A | 5/2000 | Ho | |
| 6,067,554 A | 5/2000 | Hohensee | |
| 6,078,924 A | 6/2000 | Ainsbury | |
| 6,081,817 A | 6/2000 | Taguchi | |
| 6,088,032 A | 7/2000 | Mackinlay | |
| 6,100,887 A | 8/2000 | Bormann et al. | |
| 6,108,657 A | 8/2000 | Shoup | |
| 6,111,578 A | 8/2000 | Tesler | |
| 6,119,120 A | 9/2000 | Miller | |
| 6,149,519 A | 11/2000 | Osaki | |
| 6,151,059 A | 11/2000 | Schein | |
| 6,151,604 A | 11/2000 | Wlaschin | |
| 6,151,702 A | 11/2000 | Overturf | |
| 6,163,345 A | 12/2000 | Noguchi | |
| 6,174,845 B1 | 1/2001 | Rattinger | |
| 6,175,362 B1 | 1/2001 | Harms | |
| 6,175,845 B1 | 1/2001 | Smith | |
| 6,185,551 B1 | 2/2001 | Birrell | |
| 6,188,406 B1 | 2/2001 | Fong | |
| 6,189,012 B1 | 2/2001 | Mital | |
| 6,202,068 B1 | 3/2001 | Kraay | |
| 6,211,873 B1 | 4/2001 | Moyer | |
| 6,236,994 B1 | 5/2001 | Swartz | |
| 6,237,004 B1 | 5/2001 | Dodson | |
| 6,240,421 B1 | 5/2001 | Stolarz | |
| 6,243,093 B1 | 6/2001 | Czerwinski | |
| 6,243,724 B1 | 6/2001 | Mander | |
| 6,253,218 B1 * | 6/2001 | Aoki | G06F 17/30126 |
| | | | 707/999.007 |
| 6,253,518 B1 | 7/2001 | Azar | |
| 6,262,722 B1 | 7/2001 | Allison | |
| 6,266,059 B1 | 7/2001 | Mattews | |
| 6,266,098 B1 | 7/2001 | Cove | |
| 6,275,229 B1 | 8/2001 | Weiner | |
| 6,281,898 B1 | 8/2001 | Nikolovska | |
| 6,281,940 B1 | 8/2001 | Sciammarella | |
| 6,289,362 B1 | 9/2001 | Van Der Meer | |
| 6,295,639 B1 | 9/2001 | Van Der Meer | |
| 6,308,187 B1 * | 10/2001 | DeStefano | G06F 17/30988 |
| | | | 345/618 |
| 6,310,622 B1 | 10/2001 | Asente | |
| 6,313,851 B1 | 11/2001 | Matthews | |
| 6,317,761 B1 | 11/2001 | Landsman et al. | |
| 6,335,742 B1 | 1/2002 | Takemoto | |
| 6,337,698 B1 | 1/2002 | Keely, Jr. | |
| 6,338,044 B1 | 1/2002 | Cook et al. | |
| 6,344,880 B1 | 2/2002 | Takahashi | |
| 6,351,765 B1 | 2/2002 | Pietropaolo | |
| 6,353,831 B1 | 3/2002 | Gustman | |
| 6,363,377 B1 * | 3/2002 | Kravets | G06F 17/3071 |
| 6,366,299 B1 | 4/2002 | Lanning | |
| 6,381,362 B1 | 4/2002 | Desphande et al. | |
| 6,388,665 B1 | 5/2002 | Linnett | |
| 6,392,651 B1 | 5/2002 | Stradley | |
| 6,418,556 B1 | 7/2002 | Bennington | |
| 6,425,129 B1 | 7/2002 | Sciammarella | |
| 6,434,545 B1 | 8/2002 | MacLeod et al. | |
| 6,434,598 B1 | 8/2002 | Gish | |
| 6,456,938 B1 | 9/2002 | Barnard | |
| 6,457,006 B1 | 9/2002 | Gruenwald | |
| 6,457,017 B2 | 9/2002 | Watkins | |
| 6,463,431 B1 | 10/2002 | Schmitt | |
| 6,466,237 B1 | 10/2002 | Miyao et al. | |
| 6,487,557 B1 | 11/2002 | Nagatomo et al. | |
| 6,491,585 B1 | 12/2002 | Miyamoto | |
| 6,501,469 B1 | 12/2002 | MacPhail | |
| 6,507,858 B1 | 1/2003 | Kanerva | |
| 6,538,672 B1 | 3/2003 | Dobbelaar | |
| 6,542,896 B1 | 4/2003 | Gruenwald | |
| 6,553,310 B1 | 4/2003 | Lopke | |
| 6,556,225 B1 | 4/2003 | MacPhail | |
| 6,577,350 B1 | 6/2003 | Proehl | |
| 6,581,068 B1 | 6/2003 | Bensoussan et al. | |
| 6,587,106 B1 | 7/2003 | Suzuki et al. | |
| 6,594,673 B1 | 7/2003 | Smith | |
| 6,598,043 B1 | 7/2003 | Baclawski | |
| 6,600,501 B1 | 7/2003 | Israel | |
| D478,090 S | 8/2003 | Nguyen | |
| 6,604,144 B1 | 8/2003 | Anders | |
| 6,606,411 B1 * | 8/2003 | Loui | G06F 17/3025 |
| | | | 382/165 |
| 6,613,100 B2 | 9/2003 | Miller | |
| 6,636,246 B1 | 10/2003 | Gallo | |
| 6,638,313 B1 | 10/2003 | Freeman | |
| 6,642,939 B1 | 11/2003 | Vallone | |
| 6,650,343 B1 | 11/2003 | Fujita | |
| 6,662,357 B1 | 12/2003 | Bowman-Amuah | |
| 6,668,102 B2 | 12/2003 | Chiba | |
| 6,671,692 B1 | 12/2003 | Marpe | |

(56) References Cited

U.S. PATENT DOCUMENTS

| | | | |
|---|---|---|---|
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,950,989 B2 * | 9/2005 | Rosenzweig ......... G06F 3/0481 |
| | | | 707/E17.026 |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,055,104 B1 | 5/2006 | Billmaier |
| 7,075,550 B2 * | 7/2006 | Bonadio ............... G06F 3/0482 |
| | | | 345/589 |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,292,243 B1 * | 11/2007 | Burke .................... G09B 5/00 |
| | | | 345/440 |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,366,994 B2 * | 4/2008 | Loui ................. G06F 17/30274 |
| | | | 707/E17.026 |
| 7,372,473 B2 | 5/2008 | Venolia |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 * | 8/2010 | Uy ........................ G11B 27/34 |
| | | | 715/722 |
| 7,770,217 B2 | 8/2010 | Pueblas |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,831,599 B2 * | 11/2010 | Das ................... G06F 17/30256 |
| | | | 382/225 |
| 7,844,074 B2 | 11/2010 | Moskowitz et al. |
| 7,870,489 B2 | 1/2011 | Serita |
| 7,899,818 B2 | 3/2011 | Stonehocker |
| 7,902,741 B2 | 3/2011 | Iwanaga |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,930,895 B2 * | 1/2015 | Drukman .................. G06F 8/33 |
| | | | 717/113 |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0032696 A1 | 3/2002 | Takiguchi |
| 2002/0033848 A1 | 3/2002 | Sclammarello |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |
| 2002/0078440 A1 | 6/2002 | Feinberg |
| 2002/0087530 A1 | 7/2002 | Smith |

(56) References Cited

U.S. PATENT DOCUMENTS

| | | |
|---|---|---|
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 | 10/2002 | Amir |
| 2002/0152474 A1 | 10/2002 | Dudkiewicz |
| 2002/0180795 A1 | 12/2002 | Wright et al. |
| 2003/0001898 A1 | 1/2003 | Bernhardson |
| 2003/0001901 A1 | 1/2003 | Crinon et al. |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0120681 A1 | 6/2003 | Baclawski |
| 2003/0120737 A1 | 6/2003 | Lytle |
| 2003/0121055 A1 | 6/2003 | Kaminski et al. |
| 2003/0128228 A1 | 7/2003 | Crow et al. |
| 2003/0132971 A1 | 7/2003 | Billmaier |
| 2003/0140023 A1 | 7/2003 | Ferguson |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0003398 A1 | 1/2004 | Donian et al. |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0150657 A1 | 8/2004 | Wittenburg |
| 2004/0160416 A1 | 8/2004 | Venolia |
| 2004/0177319 A1 | 9/2004 | Horn |
| 2004/0233238 A1 | 11/2004 | Lahdesmaki |
| 2004/0233239 A1* | 11/2004 | Lahdesmaki ......... G06F 3/0482 715/810 |
| 2004/0263519 A1 | 12/2004 | Andrews |
| 2005/0060667 A1 | 3/2005 | Robins |
| 2005/0108644 A1* | 5/2005 | Finke-Anlauff .. G06F 17/30997 715/721 |
| 2005/0119936 A1 | 6/2005 | Buchanan et al. |
| 2005/0138066 A1 | 6/2005 | Finke-Anlauff |
| 2005/0262533 A1 | 11/2005 | Hart |
| 2006/0013554 A1 | 1/2006 | Poslinski et al. |
| 2006/0013555 A1 | 1/2006 | Poslinski et al. |
| 2006/0013556 A1 | 1/2006 | Poslinski et al. |
| 2006/0013557 A1 | 1/2006 | Poslinski et al. |
| 2006/0020966 A1 | 1/2006 | Poslinski et al. |
| 2006/0020971 A1 | 1/2006 | Poslinski et al. |
| 2006/0045470 A1 | 3/2006 | Poslinski et al. |
| 2006/0075338 A1 | 4/2006 | Kusakabe |
| 2006/0136466 A1 | 6/2006 | Weiner |
| 2006/0156246 A1 | 7/2006 | Williams |
| 2006/0197782 A1 | 9/2006 | Sellers |
| 2006/0209069 A1 | 9/2006 | Bacigalupi et al. |
| 2006/0236251 A1 | 10/2006 | Kataoka |
| 2006/0241952 A1* | 10/2006 | Loduha ................. G06Q 10/10 705/311 |
| 2006/0242178 A1 | 10/2006 | Butterfield |
| 2006/0248129 A1 | 11/2006 | Carnes |
| 2006/0259511 A1 | 11/2006 | Boerries |
| 2007/0005576 A1 | 1/2007 | Cutrell |
| 2007/0007884 A1 | 1/2007 | Iwanaga |
| 2007/0061745 A1 | 3/2007 | Anthony |
| 2007/0061855 A1 | 3/2007 | Serita |
| 2007/0067290 A1 | 3/2007 | Makela |
| 2007/0083527 A1 | 4/2007 | Walder et al. |
| 2007/0120856 A1 | 5/2007 | De Ruyter |
| 2007/0143803 A1 | 6/2007 | Lim et al. |
| 2007/0156654 A1 | 7/2007 | Ravinarayanan |
| 2007/0168877 A1 | 7/2007 | Jain et al. |
| 2007/0171224 A1 | 7/2007 | MacPherson |
| 2007/0185826 A1 | 8/2007 | Brice |
| 2007/0192749 A1 | 8/2007 | Baudisch |
| 2007/0204218 A1 | 8/2007 | Weber |
| 2007/0214169 A1 | 9/2007 | Audet |
| 2007/0216694 A1 | 9/2007 | Audet |
| 2007/0220209 A1 | 9/2007 | Maeda et al. |
| 2007/0239676 A1 | 10/2007 | Stonehocker |
| 2007/0268129 A1 | 11/2007 | Audet |
| 2007/0271508 A1 | 11/2007 | Audet |
| 2008/0000126 A1 | 1/2008 | Teza |
| 2008/0015911 A1 | 1/2008 | Wang |
| 2008/0016142 A1 | 1/2008 | Schneider |
| 2008/0019371 A1 | 1/2008 | Anschutz |
| 2008/0022199 A1 | 1/2008 | Sako |
| 2008/0024444 A1 | 1/2008 | Abe |
| 2008/0046844 A1 | 2/2008 | Sugie |
| 2008/0058106 A1 | 3/2008 | Audet |
| 2008/0071822 A1 | 3/2008 | Audet |
| 2008/0072169 A1 | 3/2008 | Audet |
| 2008/0092038 A1 | 4/2008 | Audet |
| 2008/0098323 A1 | 4/2008 | Vallone et al. |
| 2008/0104534 A1 | 5/2008 | Park et al. |
| 2008/0111826 A1* | 5/2008 | Endrikhovski ... G06F 17/30994 345/582 |
| 2008/0118219 A1 | 5/2008 | Chang et al. |
| 2008/0133579 A1 | 6/2008 | Lim |
| 2008/0134013 A1 | 6/2008 | Audet |
| 2008/0134022 A1 | 6/2008 | Audet |
| 2008/0140448 A1* | 6/2008 | Hernandez ............ G06F 19/327 705/2 |
| 2008/0141115 A1 | 6/2008 | Audet |
| 2008/0155474 A1 | 6/2008 | Duhig |
| 2008/0163048 A1 | 7/2008 | Gossweiler, III |
| 2008/0243778 A1 | 10/2008 | Behnen |
| 2008/0244437 A1 | 10/2008 | Fischer et al. |
| 2008/0256473 A1 | 10/2008 | Chakra et al. |
| 2008/0256474 A1 | 10/2008 | Chakra et al. |
| 2008/0270361 A1 | 10/2008 | Meyer |
| 2008/0270928 A1 | 10/2008 | Chakra et al. |
| 2008/0295016 A1 | 11/2008 | Audet |
| 2008/0299989 A1 | 12/2008 | King |
| 2008/0301562 A1 | 12/2008 | Berger |
| 2008/0307343 A1* | 12/2008 | Robert ................ G06F 3/04817 715/765 |
| 2008/0307348 A1 | 12/2008 | Jones et al. |
| 2009/0019371 A1 | 1/2009 | Audet |
| 2009/0048981 A1 | 2/2009 | Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0064143 A1 | 3/2009 | Bhogal et al. |
| 2009/0070662 A1 | 3/2009 | Audet |
| 2009/0070699 A1 | 3/2009 | Birkill et al. |
| 2009/0083260 A1 | 3/2009 | Artom |
| 2009/0083859 A1 | 3/2009 | Roth et al. |
| 2009/0106684 A1 | 4/2009 | Chakra et al. |
| 2009/0106685 A1 | 4/2009 | Care et al. |
| 2009/0113334 A1 | 4/2009 | Chakra et al. |
| 2009/0116817 A1 | 5/2009 | Kim et al. |
| 2009/0150832 A1 | 6/2009 | Keller et al. |
| 2009/0164933 A1 | 6/2009 | Pederson et al. |
| 2009/0177754 A1 | 7/2009 | Brezina |
| 2009/0199119 A1 | 8/2009 | Park et al. |
| 2009/0210862 A1 | 8/2009 | Viswanadha |
| 2009/0228774 A1 | 9/2009 | Matheny |
| 2009/0228788 A1 | 9/2009 | Audet |
| 2009/0235194 A1 | 9/2009 | Arndt et al. |
| 2009/0254850 A1 | 10/2009 | Almeida |
| 2009/0284658 A1 | 11/2009 | Cho |
| 2009/0287693 A1 | 11/2009 | Audet |
| 2009/0288006 A1 | 11/2009 | Audet |

(56) References Cited

U.S. PATENT DOCUMENTS

| | | |
|---|---|---|
| 2009/0319933 A1 | 12/2009 | Zaika et al. |
| 2010/0057576 A1 | 3/2010 | Brodersen et al. |
| 2010/0070919 A1 | 3/2010 | Araumi |
| 2010/0082427 A1 | 4/2010 | Burgener |
| 2010/0082653 A1 | 4/2010 | Nair |
| 2010/0083159 A1 | 4/2010 | Mountain et al. |
| 2010/0094890 A1 | 4/2010 | Bokor |
| 2010/0145976 A1 | 6/2010 | Higgins |
| 2010/0150522 A1 | 6/2010 | Schmehl et al. |
| 2010/0169823 A1 | 7/2010 | Audet |
| 2010/0171861 A1 | 7/2010 | Ota et al. |
| 2010/0185509 A1 | 7/2010 | Higgins |
| 2010/0205563 A1 | 8/2010 | Haapsaari |
| 2010/0313158 A1 | 12/2010 | Lee et al. |
| 2010/0313159 A1 | 12/2010 | Decker et al. |
| 2010/0318200 A1 | 12/2010 | Foslien et al. |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0035700 A1 | 2/2011 | Meaney |
| 2011/0061082 A1 | 3/2011 | Heo et al. |
| 2011/0078166 A1 | 3/2011 | Oliver |
| 2011/0145745 A1 | 6/2011 | Hyeon et al. |
| 2011/0154213 A1 | 6/2011 | Wheatley et al. |
| 2011/0246926 A1 | 10/2011 | Newton |
| 2011/0307814 A1 | 12/2011 | Audet |
| 2012/0159320 A1 | 6/2012 | Audet |
| 2012/0198385 A1 | 8/2012 | Audet |
| 2012/0198389 A1 | 8/2012 | Audet |
| 2012/0249581 A1 | 10/2012 | Cassistat |
| 2012/0260204 A1 | 10/2012 | Audet |
| 2012/0262398 A1 | 10/2012 | Kim |
| 2013/0080880 A1 | 3/2013 | Cassistat |
| 2013/0080888 A1 | 3/2013 | Audet |
| 2013/0346106 A1* | 12/2013 | Xiao ............ G06Q 10/10 705/3 |
| 2015/0019252 A1* | 1/2015 | Dawson .......... A61C 8/00 705/3 |
| 2016/0092043 A1* | 3/2016 | Missig ........... G06F 3/0482 715/811 |

FOREIGN PATENT DOCUMENTS

| | | |
|---|---|---|
| JP | 07-013971 | 1/1995 |
| JP | 07-085080 | 3/1995 |
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO9903271 | 1/1999 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO02099241 | 12/2002 |
| WO | WO 03/001345 | 1/2003 |
| WO | WO 03/032199 | 4/2003 |
| WO | WO 2005/045756 | 5/2005 |
| WO | WO 2005/083595 | 9/2005 |
| WO | WO 2007/095997 | 8/2007 |
| WO | WO 2008/030779 | 3/2008 |

OTHER PUBLICATIONS

Olsen et al., "Visualization of a Document Collection: The Vibe System", Information Processing & Management, vol. 29, No. 1, pp. 69-81, 1993, Pergamon Press.*

The lifestream approach to reorganizing the information world; Nicolas Carriero, Scott Fertig; Eric Freeman and David Gelernter; Apr. 1995; Yale University.

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexander P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massahsetts Institute of Technology;http://web.archive.org/web/20070415053620/http://haystack.lcs.mit.edu/ ; http://groups.csail.mit.edu/haystack/ ; http://en.wikipedia.org/wiki/Haystack_%28MIT_project%29.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/.

Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan BÄ¶cker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/.

* cited by examiner

METHOD AND APPARATUS FOR DISPLAYING DATA ELEMENT AXES

CROSS-REFERENCES

The present application is a nonprovisional of, and claims priority under 35 U.S.C. 119(e) to, U.S. provisional patent application No. 61/658,171, filed Jun. 11, 2012, entitled METHOD AND APPARATUS FOR DISPLAYING DATA ELEMENT AXES, which is incorporated herein by reference in its entireties. Any publication of and any patent issuing from the foregoing U.S. patent application is hereby incorporated herein by reference. Furthermore, the disclosure of the priority provisional application is contained in the Appendix hereto, which is incorporated herein by reference.

BACKGROUND OF THE INVENTION

1. Field of the Invention

The subject invention relates generally to computer systems adapted to manage data elements on axes thereof. More specifically, the present invention relates to data elements organization into multiple sets for the purpose of visualization against a unique collation criterion.

2. Background of the Invention

In content management systems (CMS) using an axis-based graphical user interface (ABGUI), an axis is used to display a portion of the computer files, or data elements represented as documents, contained in the system's database. The axis of documents locates documents thereon in a comprehensive and ordered fashion so that a viewer can infer meaning from the location of each document as opposed to a display where documents are arbitrarily disposed like the well-known personal computer desktop where documents are located in a more or less ordered fashion.

The documents, each of which is assigned by default or by the user a plurality of attributes based on its form and content, are thus organized into a meaningful layout, for instance an axis, according to a specified filtering criterion using document attributes (e.g. keyword, subject, document type, user, etc.) and to a collation function (e.g. chronological order, alphabetical order, statistical order, etc.).

For example, a user may build a query to retrieve all documents corresponding to a specified filtering criterion, e.g. "patent issued in 2012", and to visualize them on an axis, collated on the basis of their issue dates, in chronological order. Further to this query, all documents containing the attribute "patents" for the year 2012 would thus appear on an axis along a time-line, forming a first set of documents. This is simple and intuitive and axes can generally be created, modified or deleted at will simply by building different queries.

For various reasons however, it is often desirable for users to view more than one set of documents at once on the same axis. For instance, in order to efficiently assess progress in a client's file, the user may wish to view all his or her patent prosecution documents in chronological order, and further bundle together all documents contained within this set that specifically pertain to Official Letter X. And so on with additional levels of grouping within sets.

But organizing and viewing documents as a collection of sets along a unique axis can be problematic if the documents contained thereon are stored in the database under a different date than the one at which the user wants the secondary set of documents to appear on the axis. For instance, the documents linked to Official Letter X (Office communication, cited art, etc.) may have been created long before or much later than the communication date of Official Letter X. They would normally appear at their respective date of creation along the axis. As a matter of fact, Official Letter X itself, having a communication date of January $1^{st}$, may have been received and docketed into the database at a later date, for example January 15. It may nonetheless be more useful to the user to if placed at the January $1^{st}$ position on the axis. Grouping together all the documents according to their relationship with Official Letter X at the communication date of Official Letter X would therefore require re-locating them at a position that does not correspond to their attributes as entered in the system.

Furthermore, documents related to the secondary set, in this case Official Letter X, may include documents that are not on the first axis. This could be the case for patent art that is only cited in relation to Official Letter X but does not have the attribute "patents issued in 2012" and therefore is not represented on that axis. This in turn poses challenges at the database level in retrieving and organizing documents that may be referenced according to different referencing modes, namely referenced by a parent document, referencing a document or neither referencing nor referenced by another document, i.e. standalone documents.

In this particular example, arranging documents into multiple sets along the same axis would imply that prosecution documents are organized chronologically except for documents related to Official Letter X, which, regardless of their respective issue date, would be placed on the axis at the January $1^{st}$ location. Patent art documents are going to be located on an axis to which they do not inherently belong and at a location different than their respective issue date. Finally, the order in which documents in the secondary set are organized may be different from the chronological order governing the axis. The user may, for example, wish to collate documents associate with Official Letter X by alphabetical order or by file type. For all these reasons, it can therefore be difficult and counterintuitive to represent multiple sets of documents graphically on a unique axis.

Organizing multiple sets of documents on a unique axis can also pose certain difficulties related to visually distinctive features (VDF's). VDF's can be ascribed to individual documents or sets thereof in the form of colors, shapes, shading, direction, etc., in order to visually signal their particularity vis-à-vis other documents. The conditions for assigning VDF's can therefore vary based on a given document's belonging to one set or another and on the hierarchy of sets queried.

It is nonetheless often desirable to organize documents in such a way. Indeed, grouping certain documents by user name, project, client, or keyword, etc. independently of the documents' dates and the attribute governing the axis can more readily help a user achieve certain goals such as assessing progress, estimating workload, etc.

There is therefore a need in the art of axis-based content management systems for a method and system of ordering and displaying on a unique axis multiple sets of documents governed by distinct collation criteria, treating the collation criteria of each set as autonomous from that governing the axis while visually maintaining the hierarchy between the different sets of documents on the axis. There is also a need in the art for computer-readable instructions that sort through documents contained in a database and referenced therein according to different default and user-specified attributes in relation to other documents. There is also a need in the art for assigning VDF's to documents and sets of documents in a manner coherent with the document's position within a given set.

Other deficiencies will become apparent to one skilled in the art to which the invention pertains in view of the following summary and detailed description with its appended figures.

SUMMARY OF THE INVENTION

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An aspect of the invention, in accordance with at least one embodiment, provides a means to display a first set of, for instance, documents in conjunction with a second set of documents when the second set of documents would not necessarily fit in the query used to select the documents of the first set of documents and/or would not necessarily fit the collation of the first set of documents. The second set of documents so located in relationship with the first set of documents having a beneficial effect for the understanding of the first set of documents.

An object of the invention, in accordance with at least one embodiment, is generally described as a method used to represent multiple sets of computer files, or documents, on the same axis of documents in an axes-based graphical user interface. The method allows, in accordance with at least one embodiment, a user, group of users, or a system, to group documents side by side into a set independently of the original location of each document included in the set, to position the various sets at a desired location on an axis which is also independent of the original location of each document, and to organize the documents in each set according to an order, or collation, independent from the ordering or collation of the axis on which the document sets appear.

The axis of documents generally refers to, but is not limited to, in accordance with at least one embodiment, a comprehensive graphical layout of documents that is substantially rectilinear and provides a viewer an indication of continuity between the documents disposed thereon. The documents are selected to be disposed on the axis on the basis of one or more attributes, and are ordered on a scale thereon according to a collation function. In addition, the axis of documents can be defined by a single axis, a double axis of documents, or more adjacent axes of documents.

The subject application, in accordance with at least one embodiment, is adapted to use a computer system to execute a method with a graphical user interface adapted to manage the juxtaposition of multiple sets of documents on an axis of documents in a manner such that documents originating from various locations, on and off the axis of documents, as well as documents sets generated using different collation criteria, can be integrated into the same axis at a designated position within the first axis' collation.

One aspect of the invention provides, in accordance with at least one embodiment, an object-oriented computing system. The computing system comprises a processor, a memory coupled to the processor, and an interface. The memory stores a data file structure which includes the identification of a document object and an axis object accommodating a plurality of documents thereon in a software program, one or more properties and a set of methods associated with the document object and the axis object, and instructions for adding the document object to the axis object individually or as part of a set at a location which may be user-specified and independent of the document's or document set's properties. The interface being adapted to display one or more axes of documents each containing multiple sets thereof, each of which may be organized according to distinct collation criteria and independently from the collation criterion used for the axis.

Another aspect of our work provides, in accordance with at least one embodiment, an apparatus comprising a computer-readable storage medium storing instructions, such as a software program adapted to carry out the embodiments. The instructions that, when executed provide a processor-based system the steps to add a set of documents to an axis of documents and add another or more set of documents to be disposed along the axis at a location departing from the initial location and ordering of each of the documents within or without the first set.

In another aspect of our work, a graphical user interface is provided. The graphical user interface displays, in accordance with at least one embodiment, an axis in accordance with the implementation of a method that manages documents on the axis when the documents are added to the axis so as to form multiple sets thereof, each of which being positioned on the axis independently of the initial location of the individual documents contained therein in relation to the first set, and being organized according to distinct collation criteria independently from the collation used for the axis.

One aspect of our work provides, in accordance with at least one embodiment, a method for assembling documents exclusively comprised within a first set or axis into secondary sets to be disposed on the same axis.

Another aspect of our work provides, in accordance with at least one embodiment, a method for generating secondary sets of documents from documents originating from within or without the first set or axis to be disposed on the same axis.

Another aspect of our work provides, in accordance with at least one embodiment, a function for positioning secondary sets of documents on an axis independently of their original location within the first set, at a location designated based on a criterion that may be intrinsic to the document, such as an attribute, or extrinsic to it, such as a specific location on the display area or a relative position on the axis.

Another aspect of our work provides, in accordance with at least one embodiment, a function for collating the documents within each secondary set independently from the collation of the first axis.

Another aspect of our work provides, in accordance with at least one embodiment, a means to form a linear axis scale using collation units of equal size.

Another aspect of our work provides, in accordance with at least one embodiment, a means to form a non-linear axis scale using collation units of unequal size.

Another aspect of our work provides, in accordance with at least one embodiment, a method of generating multiple sets of documents to be disposed on more than one axis, allowing document sets to either be exclusively disposed on one axis or to be disposed over more than one axis in an order and structure specified in a query.

Another aspect of our work provides, in accordance with at least one embodiment, a method for applying visually distinctive features to documents within or outside document sets on an axis.

Another aspect of our work provides, in accordance with at least one embodiment, a method to locate on an axis presenting a collation function, documents that present the attribute used to select documents to be represented on the axis but do not present an attribute corresponding to the collation criterion.

One other aspect of our work provides, in accordance with at least one embodiment, a non-transitory computer-readable medium having stored thereon computer-readable instructions that, when executed by a processor of a computer system, cause the computer system to perform operations for displaying an array of computer-readable files on a display, the operations comprising: defining a first set of computer-readable files on a basis of a first filtering criterion; defining a first collation function for ordering the first set of computer-readable files; defining a second set of computer-readable files on a basis of a second filtering criterion; defining a position for locating the second set of computer-readable files in conjunction with the first ordered set of computer-readable files; and displaying a combination of the first and second sets of computer-readable files in an array of computer-readable files, the first set of computer-readable files being ordered on a basis of the first collation function, wherein the second set of computer-readable files is displayed on a basis of the defined position.

An aspect of our work provides, in accordance with at least one embodiment, a computerized system configured to read computer-executable instructions adapted to enable a program enabling an interface adapted to order and display computer-readable files, the computerized system comprising a processing unit configured to process the computer executable instructions; and a display configured to display the interface; the program, when executed, being operative to define a first set of computer-readable files on a basis of a first filtering criterion; define a first collation function for ordering the first set of computer-readable files; define a second set of computer-readable files on a basis of a second filtering criterion; define a position for locating the second set of computer-readable files in conjunction with the first ordered set of computer-readable files; and display a combination of the first and second sets of computer-readable files in an array of computer-readable files, the first set of computer-readable files being ordered on a basis of the first collation function, wherein the second set of computer-readable files is displayed on a basis of the defined position.

Another aspect of our work provides, in accordance with at least one embodiment, a method of combining a plurality of sets of documents on a display is hereby presented, the method comprising providing a first plurality of documents on a basis of a first filtering criterion, providing a second plurality of documents on a basis of a second filtering criterion, displaying and ordering the first plurality of documents in accordance with an order defined at least in part on a basis of a first collation function, displaying the second plurality of documents in operative combination with the first plurality of documents, the second plurality of documents being disposed among the first plurality of documents as a group of documents at a location along the order of the first plurality of documents to include in the first plurality of document documents that do not reflect one of the first filtering criterion and the first collation function.

These and other advantages and features of the present invention will become apparent from the following description and the attached drawings.

DESCRIPTION OF EMBODIMENT(S) OF THE INVENTION

Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, well-known structures and devices are shown in block diagram form in order to facilitate describing the present invention.

The features provided in this specification mainly, but might not exclusively, relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon to with a computer or a machine having the appropriate code/instructions reading capability.

Figure 1:
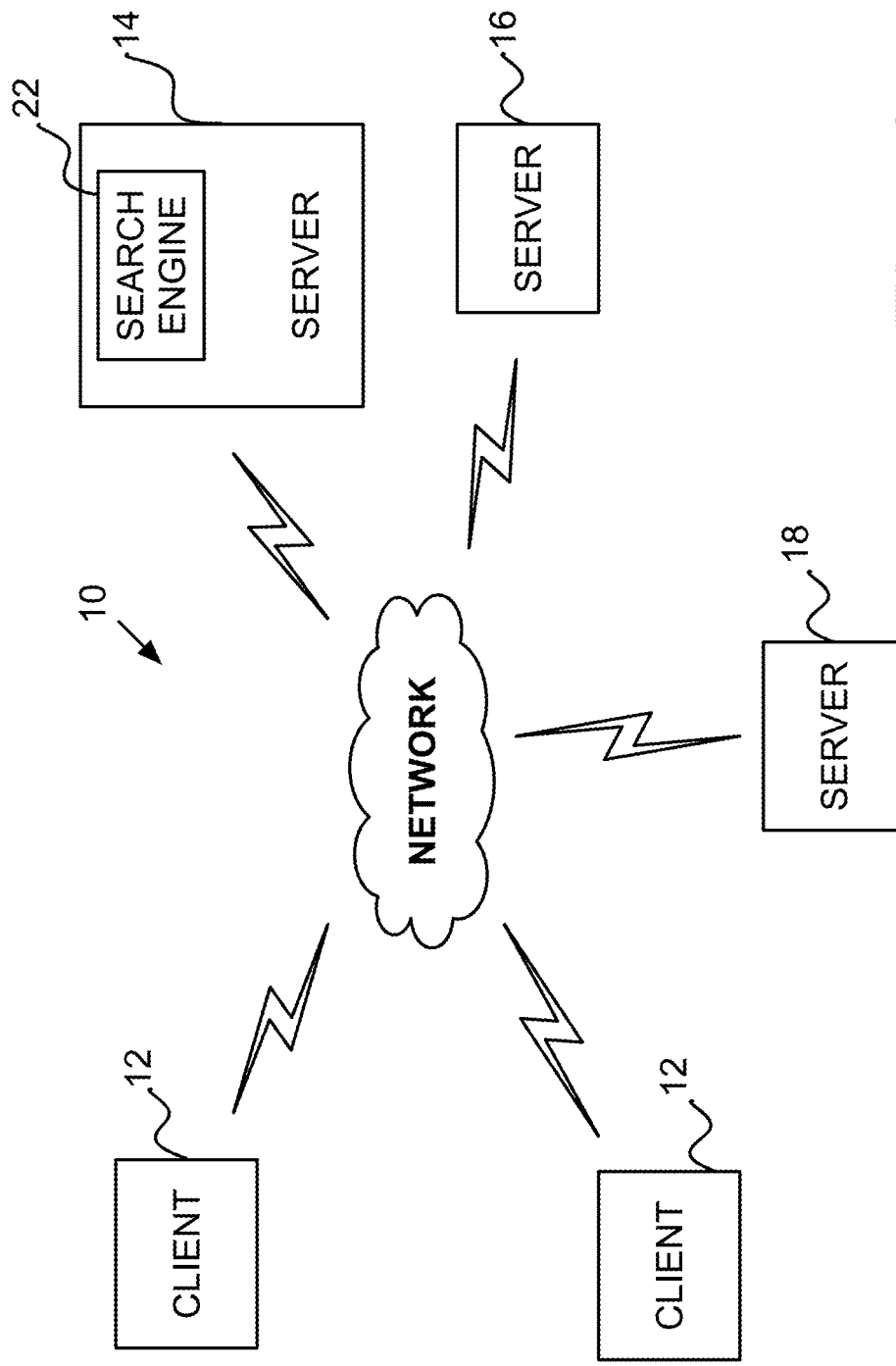
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices, such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14, 16, 18 may include one or more types of computer system, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over the network 20 or receive data from the network 20 via a wired, wireless, or optical connection.

In an implementation consistent with the present invention illustratively embodied herein, the server 14 may include a search engine 22 usable by the client devices 12. The servers 14, 16, 18 may store documents 200, such as web pages, accessible by the client devices 12.

Figure 2:
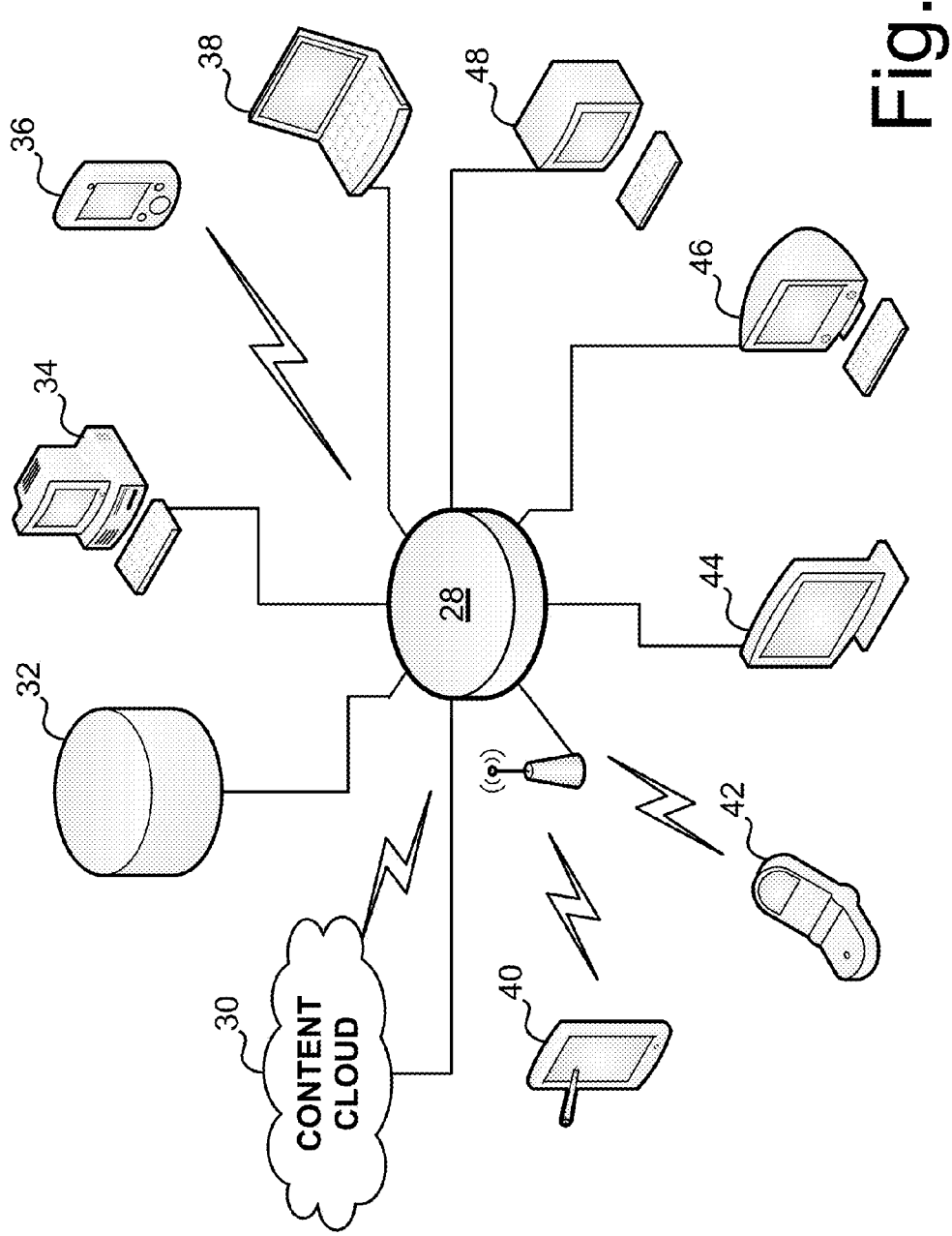
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 32-48 to communicate with each other without pre-configuring each device. The content cloud 30 represent a content source such as the Internet, where content exists at various locations across the globe that could be reached through a wired connection and/or with a wireless connection. The content includes multimedia content such as audio and video. The mediator 28 allows the content cloud to provide content to devices 34-48. The content database 32 is a storage device that maintains content. The content database 32 may be a stand-alone device on an external communication network. The mediator 28 communicates with the content database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 30-48 can also operate as servers to distribute content to other client devices.

The following discussion provides a brief, general description of an exemplary computer apparatus in which at least some aspects of the present invention may be implemented. The present invention will be described in the general context of computer-executable instructions, such as program modules 174, being executed by a computerized device. However, the methods of the present invention may be affected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor system, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network as exemplified in FIG. 2. In a distributed computing environment, program modules 174 may be located in local and/or remote memory storage devices.

Figure 3:
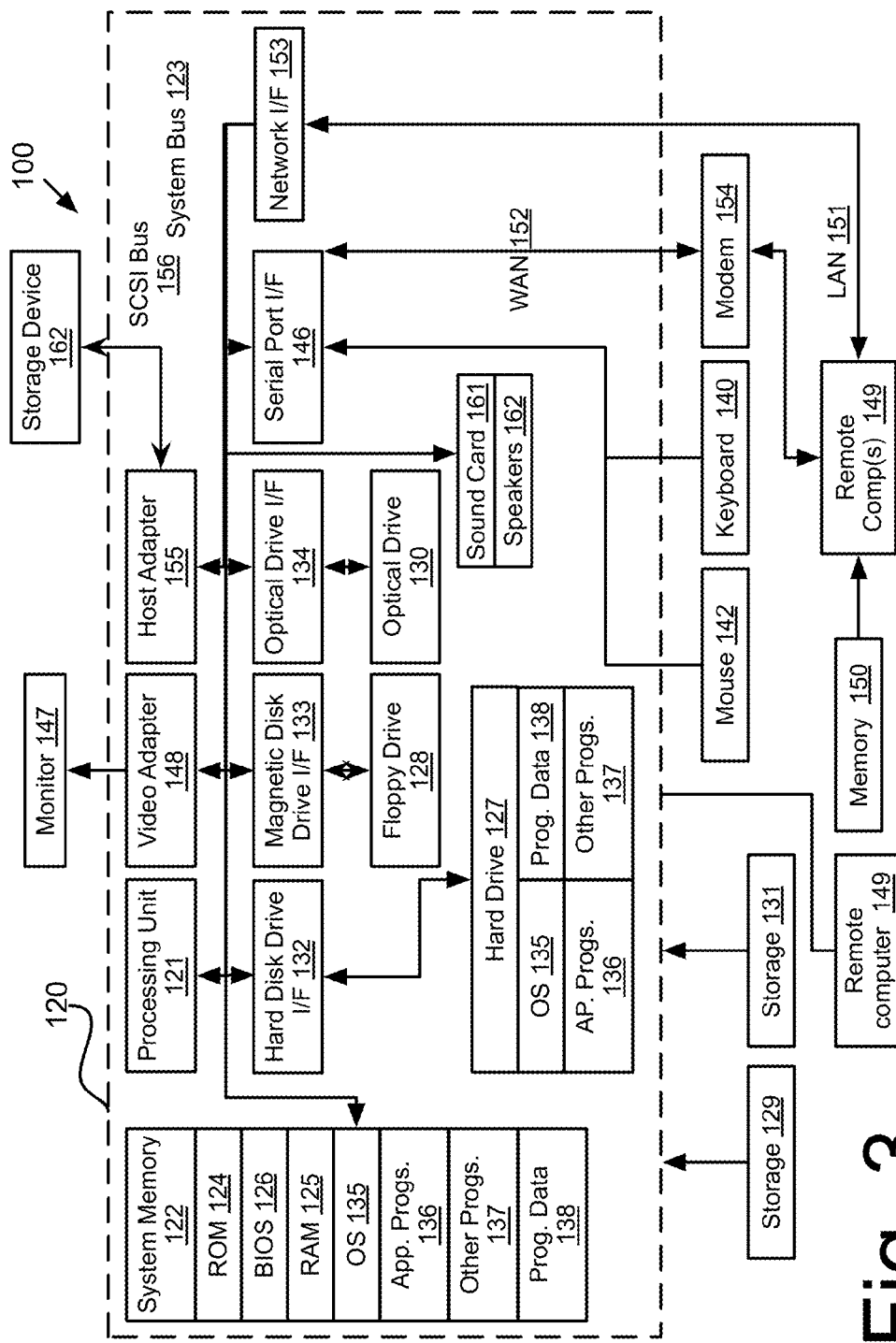
FIG. 3 is a schematic illustration of an exemplary computer system.

With reference to FIG. 3, an exemplary apparatus 100 for implementing at least some aspects of the present invention includes a general-purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine readable instructions, data structures, program modules 174 and other data for the computer 120. Although the exemplary environment described herein employs a hard disk, a removable magnetic disk 129 and a removable optical disk 131, these skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices introduced above.

A number of program modules 174 may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment which defines logical connections to one or more remote computers, such as a remote computer 149. The remote computer 149 may be another computer, a server, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device. The network connections shown are exemplary and other means of establishing a communications link between the computers may be used.

Figure 4:
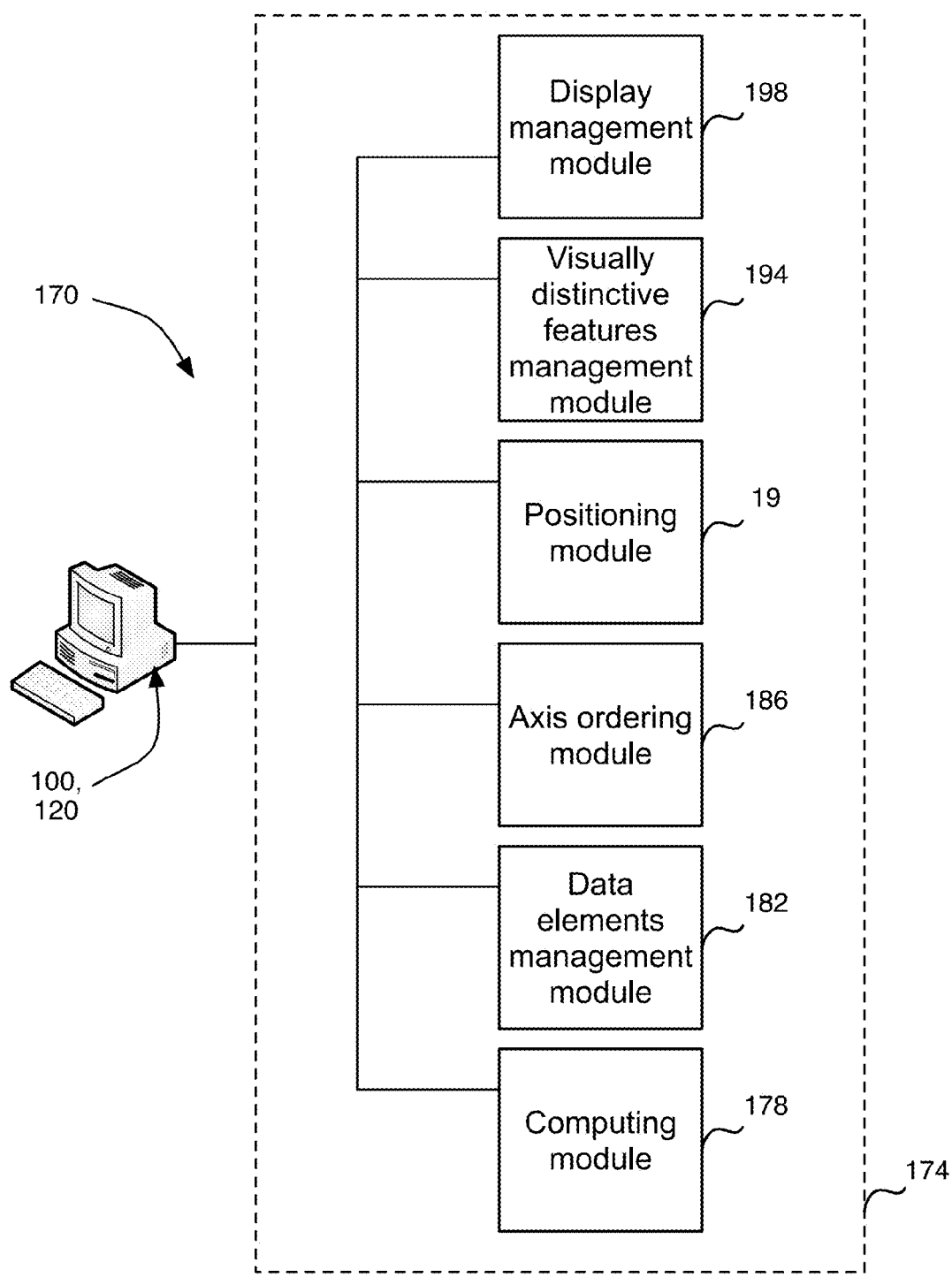
FIG. 4 is a schematic illustration of an exemplary software system.

The exemplary network and the exemplary computer system described above are adapted to carry on the following embodiments:

A system 170 is depicted in FIG. 4 which may represent the functionalities described in the instant application when run on an apparatus 100, for instance a computer 120, such as has been previously described. The software system 170 illustratively consists of a collection of at least six modules 174 that together carry out the method required for the functionalities to be visible on a graphical user interface and usable by the user. A computing module 178 provides a means to circulate data between users, the other modules 174 and the apparatus 100. The computing module 178 is adapted to convert queries 210 which may be system-based, or user-based, into graphical rendering in accordance with at least one embodiment of the present invention. The other modules 174 are configured to send to and receive data from the computing module and to individually or collectively interact with other modules 174.

A data elements management module 182 may be used in conjunction with other modules to manage data elements such as documents 200 contained in a database 32 in response to a query 210. The data elements management module 182 may sort through documents 200 stored in the database 32 and connected to each other via a variety of referencing modes, may apply a filter as specified in a query 210 and may subsequently direct the filtered documents 200 to other modules. One such module may be an axis ordering module 186 which may distribute documents 200 filtered by the data elements management module 182 onto an axis 300 according to a collation function that may be user-specified and analyzed by the computing module 178.

An axis 300 can be embodied as being a substantially rectilinear display arrangement of documents 200 from which a viewer can infer an order, sequence and/or relationships between documents 200. An axis 300 distribution of documents is adapted to accommodate a single type of documents 200 or, if desired, more than one type of documents 200, computer files, multimedia contents and/or user-selectable menu elements. Using an axis 300 of documents helps to meaningfully and intuitively display a group of documents 200. Other functionalities related to axes 300 shall be described in greater detail below.

The axis ordering module 186 may manage the ordering of single documents 200 and/or several documents 200 assembled into document sets 220 onto one or more axes 300. In addition of managing the collation of documents 200 onto an axis 300, the axis ordering module 186 may also manage the order of the documents 200 contained within document sets 220. The positioning module 190 manages the positioning of document sets 220 within axes 300 based on interactions with other modules 174 processing the various elements contained in a query 210. The positioning module 190 is adapted to and may interpret data contained in document sets 220 generated by the data elements management module 182 in relationship to the query 210 to identify a location for a given document set 220 within the collation of an axis 300. Likewise, a visually distinctive features 230 management module 194 is adapted to interpret data contained in documents 200 or document sets 220 generated by the data elements management module 182 in relationship to the query 210 to selectively apply one or more visually distinctive features 230 to single documents 200 or document sets 220. Finally, a display management module 198 may, inter alia, manage elements related to the user interface 250, possibly interacting with a graphics card and a monitor 147.

An interface program providing an interface 250 for managing documents 200 in accordance with an embodiment of the invention is installed on a machine e.g. a computer system 120. The interface 250 can be programmed using various programming languages e.g. C++, Java or other suitable programming languages. Programming of these languages is well known in the art and is adapted to be readable to provide executable instructions to a hardware system and will not be further described therein. The interface 250 might run through the operating system and the hardware of the computer system 120 or, alternatively, through a network-based system e.g. client-server, and/ cloud computing system. The interface 250 is adapted to manage documents 200, computer files, pictures, multimedia content, applications (i.e. computer programs), menu elements, sets of icons and other user-selectable elements in a comprehensive fashion.

As skilled readers in the art are going to appreciate in the aforementioned text and appended figures, documents 200 are stored on a machine-readable medium and can be retrieved on demand with the interface 250 program. Documents 200 are disposed in an axis-like layout providing a visually comprehensive display arrangement of the documents 200. An axis 300 is adapted to accommodate a single type of documents 200 or, if desired, more than one type of documents 200, and/or a mix of documents 200, computer files, multimedia contents, informational icons, and/or user-selectable menu elements.

An axis 300 of documents 200 can be embodied as being a substantially rectilinear arrangement of documents 200 adapted to dispose each document 200 on a straight or curved line. The axis can be completely straight, slightly curved, substantially curved, circular, angled, following a particular shape or having a consistent shape over which documents are disposed in a reasonably consistent fashion adapted to allow a viewer to infer a comprehensive suite of documents 200. The exact shape of the axis 300 can vary, what matters, inter alia, is that the layout structure of an axis 300 provides a comprehensive sequence of documents 200 from which a viewer can infer an order, sequence or relationship thereof. The axes presented in the embodiments below are illustrated in the horizontal position while they could alternatively be disposed vertically without departing from the scope of the present disclosure.

When only a portion of the axis 300 is visible, a play of zoom, pan and movements along the axis 300 allows a viewer to navigate on the axis 300 and change the document (s) 200 that is (are) displayed. Documents 200 might overlap or decrease in size to squeeze more documents 200 into the space available on the display. Magnification of selected documents 200 on an axis 300 can be made to increase the level of detail of the selected documents 200. Similarly, a small display area could display only one document 200 from the axis 300 while the remaining documents 200 from the axis 300 would not be displayed but would nonetheless remain at their respective "virtual" position on the axis 300, ready to be displayed upon scrolling of the axis 300. In other words, if we consider a mobile platform like a mobile phone having a small display, the small display area might allow to efficiently display only one document 200 at the time. However, the displayed document being part of an axis 300, the other documents 200 on the axis 300 remain displayable on the display in accordance with their respective position on the axis 300 when the axis is scrolled/navigated/gestured.

Each axis 300 groups documents 200 in accordance with, for example, a selected tag, a category, keywords, document creator, or an attribute that is commonly shared among the documents 200 displayed on the axis 300. The term "attribute" 312 will consistently be used throughout the instant specification to lighten the reading of the text and will include the other commonality between documents 200 described therein unless otherwise specified. Attributes 312 include user-specified attributes 312 and system-specified attributes 312. Generally, documents 200 bear a plurality of attributes 312 that relate to their content and meaning (keyword, user, category, etc.) and a plurality of attributes 312 that relate to their form (file type, time of creation, number of views, time of last modification, etc). Form-related attributes 312 are generally automatically generated, but could also be user-specified without departing from the present invention. The selection of one or more attributes 312 (using Boolean logic for instance) in a query 210 determines which documents will be displayed on the axis 300. If no specific attribute 312 is selected, then, the axis 300 displays all documents 200. Thus, all documents 200 on the same axis 300 are normally associated with the selected set or combination of attributes 312. Trivial data, like publicity or specific related information, could be added to an axis without departing from the scope of the present invention as long as the outcome remains a presentation of documents resulting from a query 210.

The attributes 312 of a document 200 can be selected to create another axis 300 thereof. The attribute of a document 200 from the newly created axis 300 can be selected to create an additional axis 300 and so forth. This is what could be called "relational navigation" and is well described in the United States patent application publication referred to at the beginning of the present patent specification. Hence, the user can "navigate" along axes 300 in accordance with their categorization to visualize the documents 200. Navigation tools are provided with the interface 250 to allow navigation through various axes 300, when a plurality of axes 300 is enabled, and through the documents 200 of a single axis 300. In the context of the present invention, a single sequence of documents 200 forming an axis 300 along a time scale 304 is one illustrated embodiment because it is easy to sequentially navigate throughout the documents 200 disposed along the axis 300.

An axis 300 disposes the documents 200 selected in a query 210 in accordance with according to a specified order or collation function, (e.g. chronological order, alphabetical order, statistical order, increasing file size, etc.), or not. Indeed, an axis 300 disposing documents in random fashion is contemplated within the scope of the present disclosure. However, axes 300 disposing documents 200 according to a collation function are illustrated embodiments because of the usefulness and ease of use of ordering documents 200. A collation function would dispose each document 200 along the axis 300 according to the value of a specified attribute 312 in relation to the collation units 307 of the axis and, optionally, other documents 200 in the document set 220. Attributes 312 used to determine a collation generally tend to be form-related attributes 312, but content related attributes 312 could also be used to generate a collation without departing from the present invention. Among collation functions, a chronological distribution of documents 200 sorting documents 200 on a time scale 304 is used in embodiments of our work because of its intuitiveness.

Figure 5:
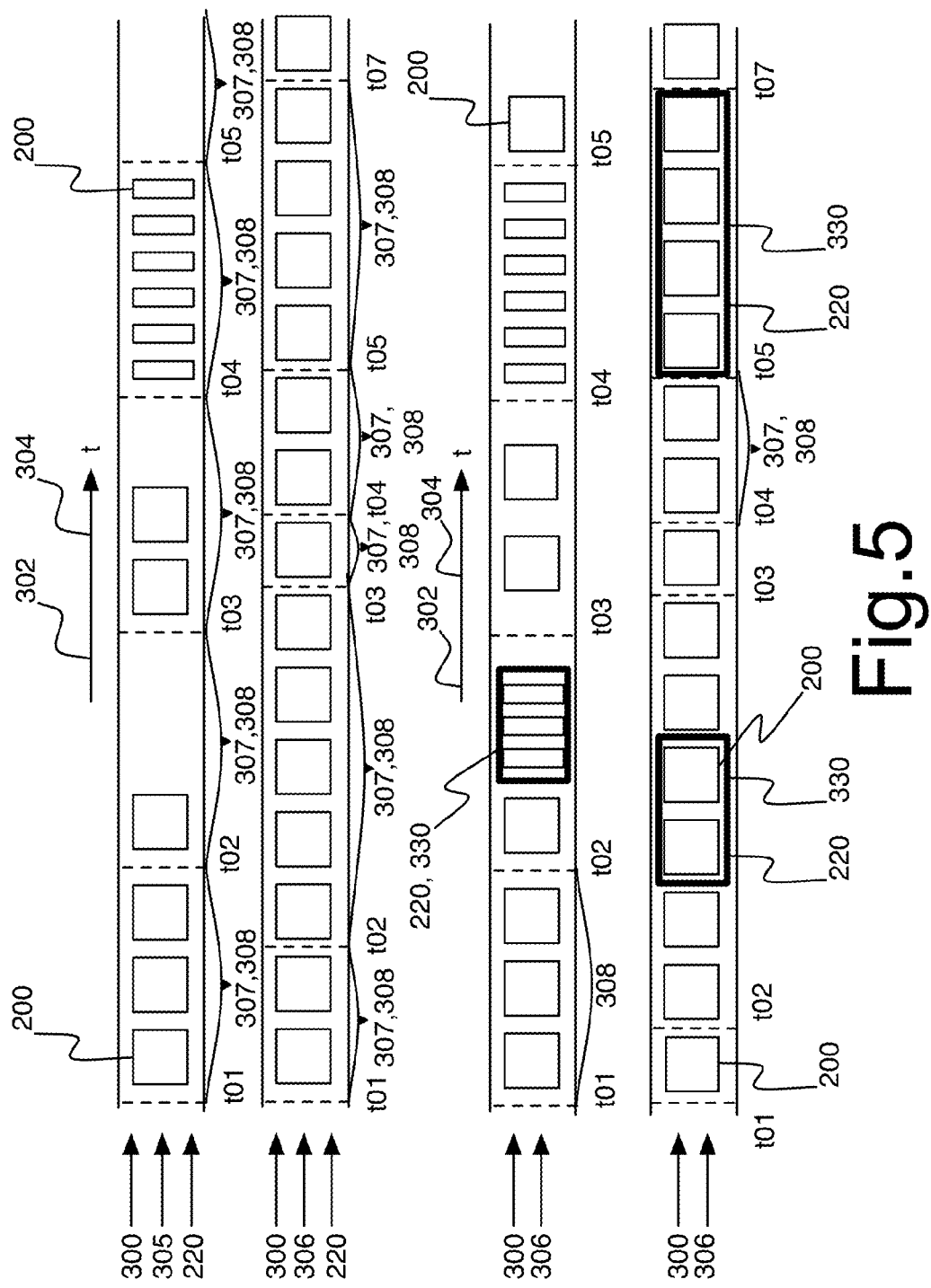
FIG. 5 is a schematic illustration of an axis with a linear collation scale and an axis with a non-linear collation scale.

FIG. 5 illustrates an axis 300 using a chronological order as a collation function 302 for disposing documents 200 thereon. The time scale 304 is divided into a plurality of time units 308. As is illustrated in FIG. 5, the time scale 304 can either be linear or non-linear. A linear configuration 305 displaying time units 308 of the same graphical size, or length, on the axis 300, and a non-linear configuration 306 displaying time units 308 of unequal size. The linear configuration 305 illustrated in FIG. 5 shows time units 308 that are of equal size regardless of the number of documents each one contains. In linear configurations 305, time unit 308 size is given primacy over documents 200 distribution and documents' 200 size, meaning that the size of the documents 200 within a time unit 308 will appear in full scale if there are few documents 200 in the time unit 308 and will appear in reduced scale if too many documents 200 are found therein to all be completely displayed in order for all of them to be visible in the subject time unit. Conversely, the non-linear configuration 306 might non-evenly display time units 308 because an even distribution of documents 200 along the time scale 304 prevails over the linearity of the time scale 304. In other words, document 200 size and a constant juxtaposition of documents 200 are given primacy over having time units 308 of equal graphical size. This may result in some time units 308 not appearing at all on the axis 300, such as is illustrated in FIG. 5.

The visual display of document sets 220 will also vary based on the configuration of the axis 300 they are disposed on as linear or non-linear, as is illustrated in FIG. 5. In a linear configuration 305, a document set 220 may take as much of the time unit's 308 space as is allowed by other documents 200 contained in the same time unit 308. The size of the documents 200 contained in the document set 220 will therefore vary based on their number and the maximal size of the document set 220. In a non-linear configuration, document sets 220 can occupy as much space as the number of documents 200 contained in it. In other embodiments, as shall be seen below, groups containing a large number of documents 200 may also be sized manually by the user.

Axes 300 can also, illustratively, be embodied as a group of juxtaposed axes 300 grouped together to form a matrix 370. In a matrix 370, one axis 300 (e.g. horizontal direction) of the matrix 370 can collate documents on a time scale 304 while the other axis 300 (displayed horizontally or vertically/orthogonal to another axis of documents, . . . ) may use another collation function 302 such as the type of computer file of each document 200. Another axis 300 can also use a time scale 304 if desirable. Such an embodiment shall be illustrated and described in further detail below. Other graphical layouts of documents 200 might become obvious to a skilled reader in light of the present application and would be considered within the scope of this application.

The display of documents 200 on an axis 300 allows to contextually manage documents 200 as a flow, or an ongoing sequence of documents 200. Using an axis 300 of documents 200, or several axes 300, thus helps gain additional meaning and intuitively display a group of documents 200 thanks to the comprehensive layout, consistent display and distribution of the documents 200 thereon.

Figure 6:
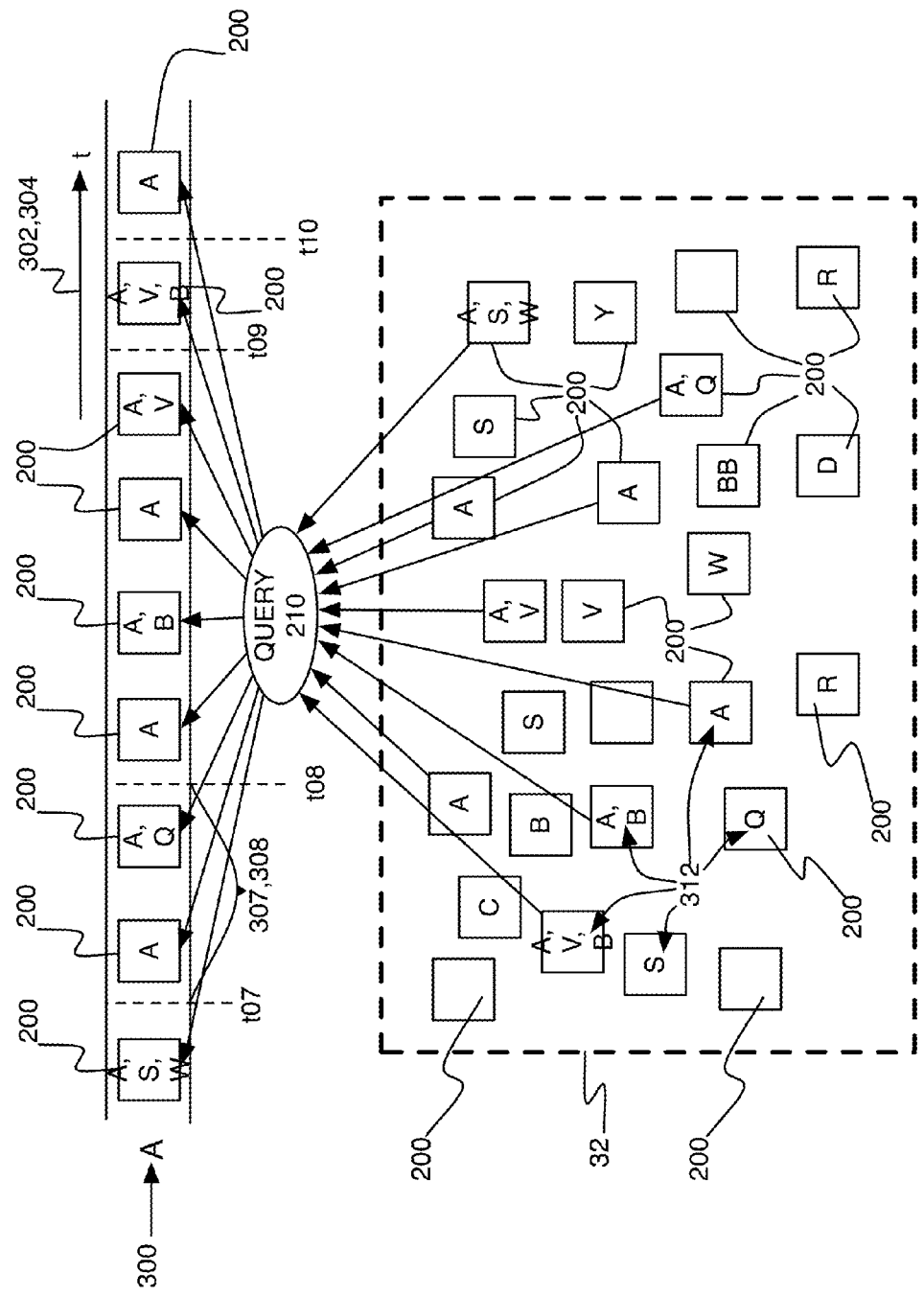
FIG. 6 is a schematic illustration of an axis linked to data elements contained in a database in accordance with an embodiment of the present invention.

FIG. 6 represents a database 32 containing a plurality of documents 200, a selection of which is represented on an axis 300 after being processed by a query 210. The documents 200 in database 32 are illustrated as having an attribute 312 represented by one or more letters, or none, in which case the documents 200 are left blank. Letter attributes 312 are used in the present application for illustrative purposes only: while letter attributes are theoretically possible, descriptive attributes 312 based on a document 200's form and content, such as keywords, user name, document type, etc., are used in embodiments of the present invention. As is shown in FIG. 6, any document 200 can simultaneously be assigned multiple attributes 312, by the user or by the system, as will be illustrated later. In fact, a preferred embodiment of the invention assigns a plurality of attributes 312 to every document 200 in the database 32, some user-specified and others system-specified. Other documents 200 illustrated on FIG. 6 are blank, or without any associated attribute 312, illustrating documents that could theoretically not be assigned any attribute 312 by the user or by the system, but that could nonetheless be created and found in a query 210 such as one that would select all documents 200 contained in the database 32.

The query 210 in FIG. 6 here illustratively selects documents 200 from the database 32 based on attribute 312 "A" for display on the axis 300. FIG. 6 further illustrates that the documents 200 selected from the database 32 by the query 210 are placed on axis 300 in chronological order, another element of the query 210. While it is possible, as was explained above, for documents 200 to be placed on an axis 300 in random order, or the order in which the search engine finds each document, a preferred embodiment of this invention collates documents 200 according to an order, such as, for instance, chronological, alphabetical or statistical order, in a manner such that a user may more readily infer meaning from the selection of documents 200 represented on the axis 300. Documents 200 collated onto an axis 300 in chronological order may be placed within the axis 300's time units 308 according to such attributes 312 as, inter alia, time of creation or time of last modification. Similarly, documents 200 collated in alphabetical order may be placed within the axis 300's alphabetical collation units 307 according to, illustratively, attributes 312 such as the first letter of their name, of their creator's name or of their file type. Documents 200 collated onto an axis 300 in statistical order may illustratively be placed within numerical collation units 307 according to such attributes 312 as the number of times viewed, or the number of times referenced in other documents 200. Again, the attributes 312 used to determine a document 200's position within the axis 300's collation may be user-specified or attributed automatically by the system.

A query 210 leading to the creation of a first set of documents 200 embodied as axis 300 as represented in FIG. 6 could be generalized as follows:

$$\text{Conf}(\text{AXIS}a) = \langle CS_a, C_a, E_a \rangle \qquad \text{Equation 1}$$

Whereby $CS_a$ is a filter applied on all documents 200 contained in database 32 which selects for attribute 312 "A", $C_a$ is an collation function based on, for example, the time of creation of each document 200 and $E_a$ is an equivalence class that gathers the ordered documents into collation units. In other words, once a document 200 is selected as having attribute 312 "A", it is then disposed on the axis 300 at the collation unit 307, in this case a time unit 308, matching a collation value 316, in this case creation date. The collation function $C_a$ 302 compares the collation values 316 of two documents 200 and returns one of the symbols "<", "=" or ">" based on whether the value of the first collation value 316 is less than, equal to or greater the value of the second parameter 316. One skilled in the art would understand that this definition of the collation function $C_a$ provides an efficient way to orders documents 200. The equivalent class $E_a$ is a relation in which multiple documents 200 are considered equivalent if they should appear in the same collation unit 307.

Although the collation function $C_a$ and the equivalent class $E_a$ may be based on the same attribute (in the case of FIG. 6, the creation date), the equivalence class may consider inexact attribute value matching. By example, the creation date may consider hour of the day while the collation units 307 groups documents of the same day. In this case, the equivalent class $E_a$ may consider equivalent two documents 320 of the same day but with different hours of the day. The collation function may still sort the documents 320 by the hour of the day within the same collation unit 307.

Figure 7:
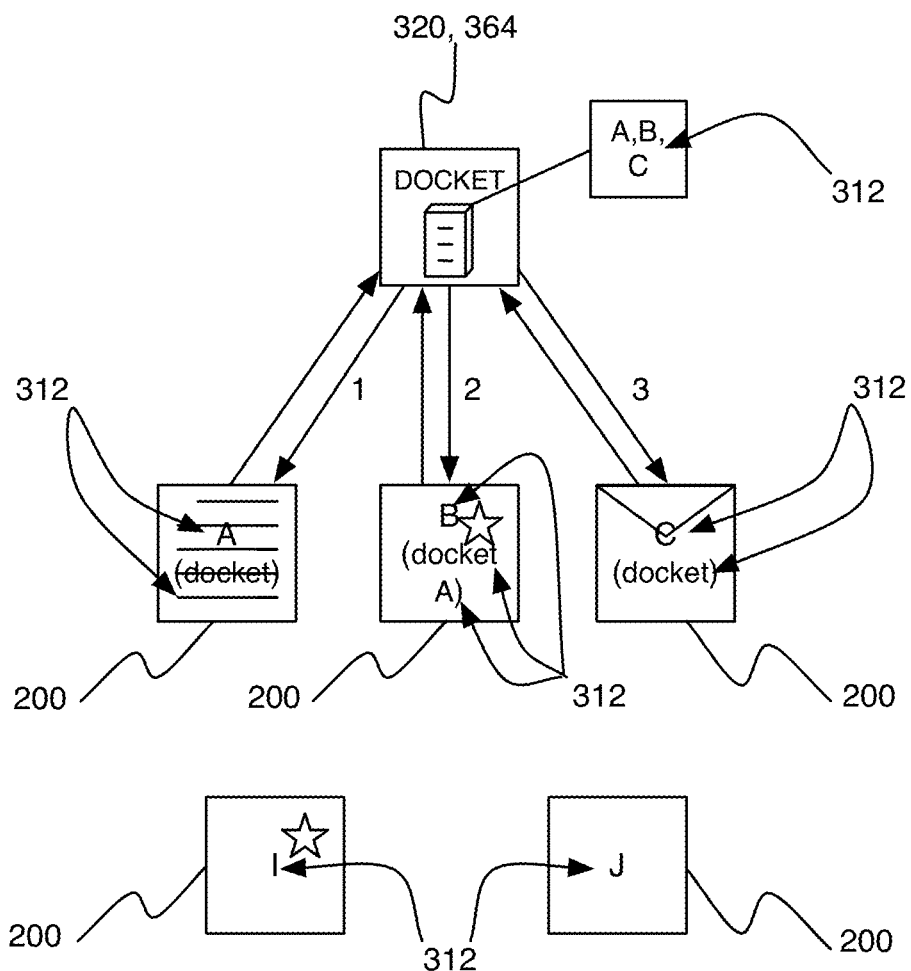
FIG. 7 is a schematic illustration of various modes of referencing documents

On FIG. 7, three different modes of referencing documents 200 in databases 32 are schematized, which a person skilled in the art will readily recognize as the most common database referencing modes. The example illustrated in FIG. 7 is one in which a given file, for instance a docket entry 320, may reference three different documents 200, in this case A, B and C. This mode of referencing, whereby the docket entry 320 references a plurality of documents 200, is represented on FIG. 7 by arrows originating from the docket entry 320 icon and connecting to each of the three documents 200. In a database 32, the docket entry 320 would reference documents 200 A, B and C by simultaneously bearing an attribute 312 for each one. Attributes 312 referencing documents 200 amongst themselves may be user- or system-specified. Alternatively, a docket entry 320 may not reference documents 200 A, B and C but rather, documents 200 may individually reference the docket entry 320. This would mean that each document, in addition to its own attributes 312, would also bear an attribute 312 for docket entry 320. In such a referencing mode, documents 200 A, B and C referencing the same docket entry 320 may or may not reference each other. Finally, some documents 200 are considered "standalone" in that they are neither referenced by nor referencing other documents 200. For instance, a standalone document 200 may bear nothing but its own attributes 312, which may include a plurality of content attributes 312 and form attributes 312 that permit collation to an axis, but no other reference to or from other documents 200.

Figure 8:
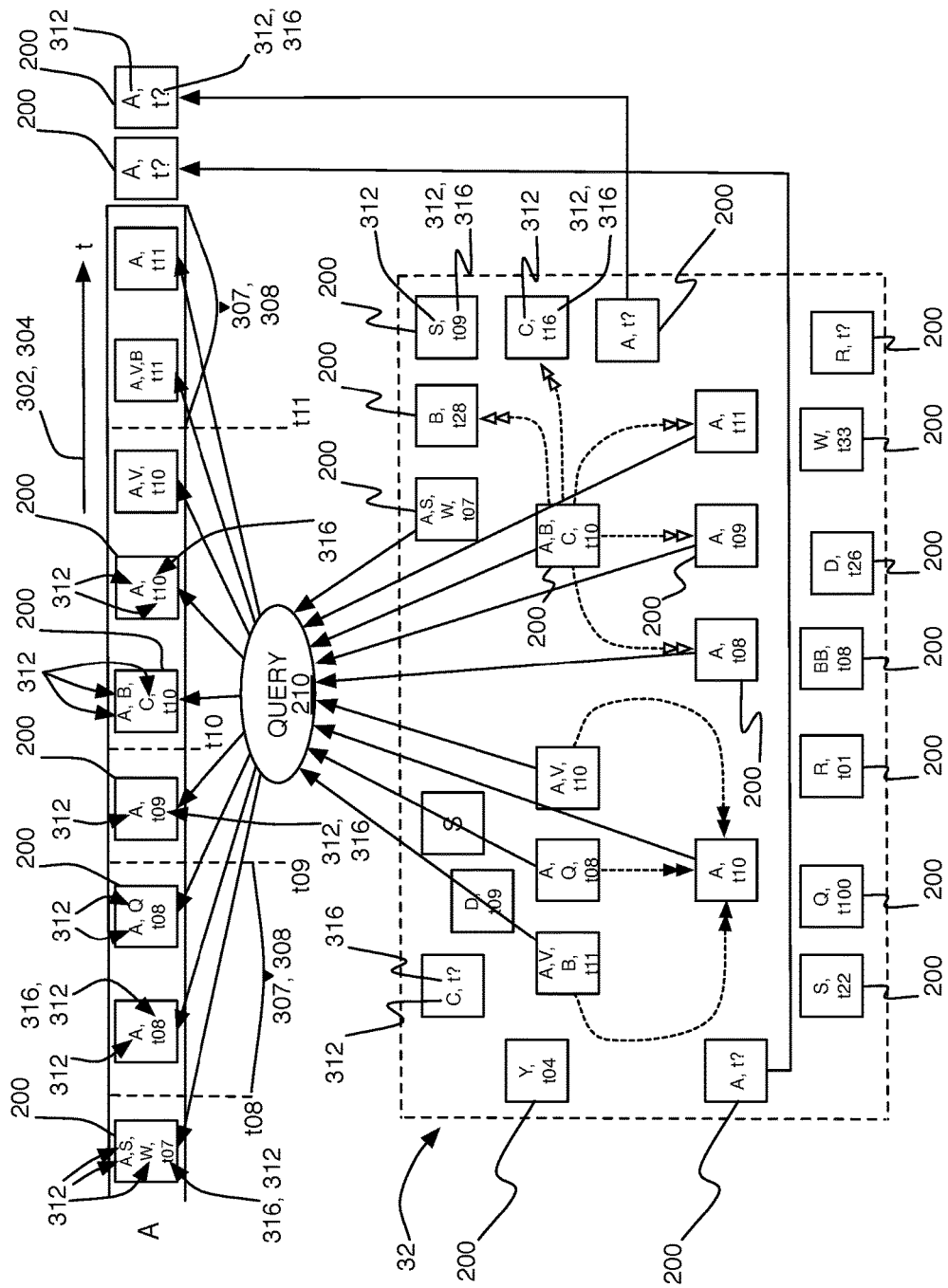
FIG. 8; is a schematic illustration of an axis layout of documents containing a plurality of attributes and referencing modes.

On FIG. 8, a database 32 containing documents 200 referenced according to the different referencing modes outlined above is illustrated, together with an Axis 300 selecting all documents 200 bearing attribute 312 "A" and collating them in chronological order in time units 308 according to the collation value 316 each one presents. In this embodiment, the axis 300 presents a non-linear configuration. In FIG. 8, documents 200 bearing attribute 312 "A" but no time reference, such as is a possible occurrence, are placed at one end of Axis A 300, outside the axis 300. It is encompassed by the present invention to provide a method to position such documents as part of an axis 300 without requiring a collation unit 307.

Figure 9:
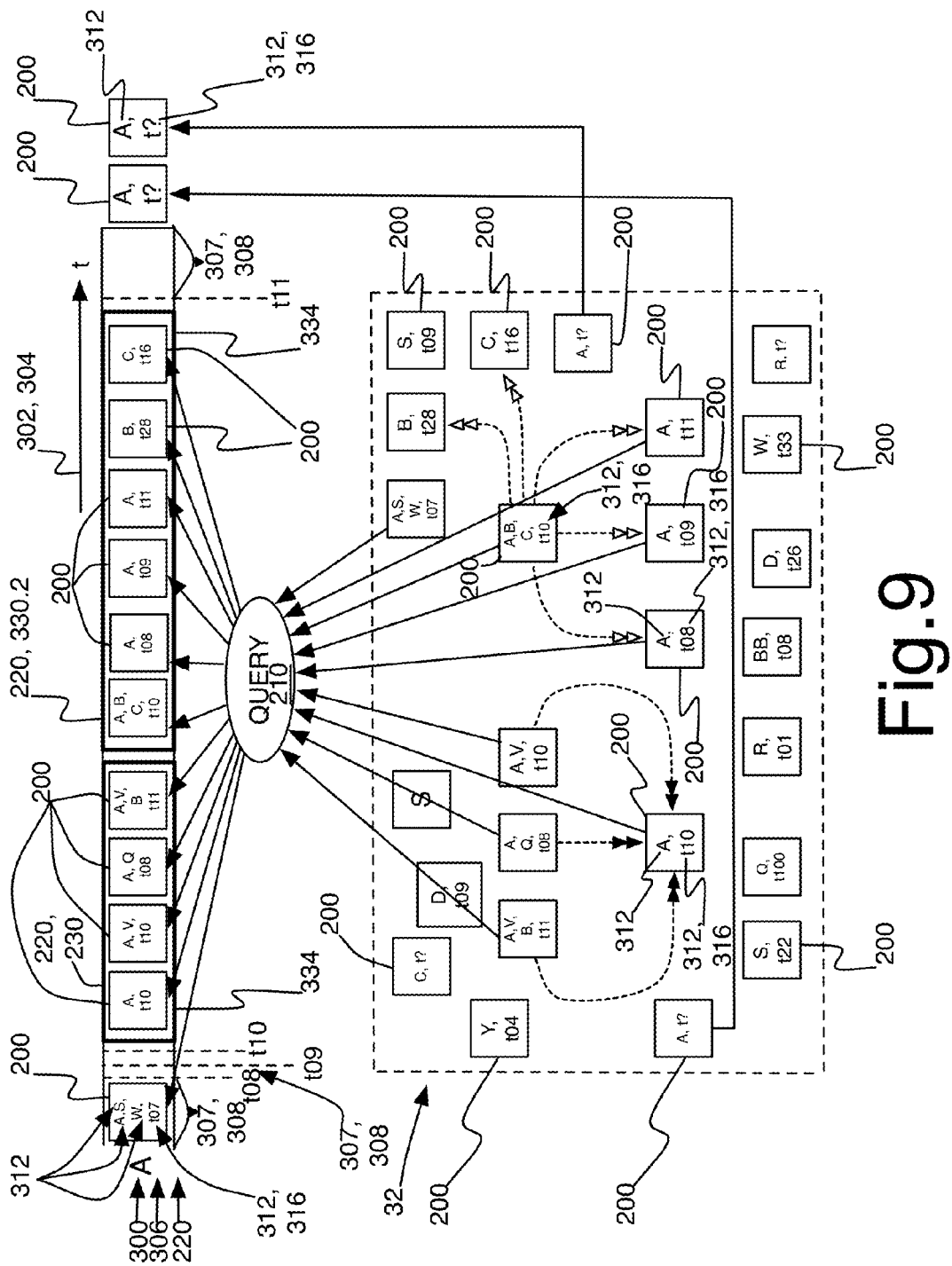
FIG. 9 is a schematic illustration of a database and axis containing two secondary sets of documents.

These various modes of referencing have implications for grouping documents 200 into document sets 220 and representing these document sets 220 on an axis 300. For instance, if forming a set of documents 200 related to docket entry 320, an accurate search would need to retrieve documents 200 that are referenced by the docket entry 320 as well as those that reference it. This is illustrated in FIG. 9, which depicts an axis 300 formed from a plurality of documents 200 stored in a database 32 that present an attribute 312 "A". Two secondary sets 330 are illustrated on the axis 300 as well as documents 200 not presenting a time reference. In this figure, a search engine first retrieves documents 200 presenting attribute 312 "A", including "A" documents 200 not presenting a time reference, which are disposed to the right of the axis 300, outside the time scale 304. The system then retrieves documents 200 according to a query 210 generating secondary sets 330.1 and 330.2. The documents 200 contained in the database 32 are referenced therein according to the different referencing modes outlined above. Documents referenced by document 200 ABCt10 are thus grouped together, as well as documents 200 referencing document 200 At10. As is illustrated in this figure, the referencing of documents 200 as linked to a document 200 specified in the query 210 takes precedence over each document 200's time reference in positioning the documents 200 on the axis 300.

FIG. 9 also illustrates the two main forms of grouping contemplated in the present disclosure. Secondary set 330.1 is formed exclusively of documents 200 forming part of the document set 220 generated for display onto the axis 300 by virtue of presenting the attribute 312 "A". As such, it is a subset of axis 300 "A". On the other hand, secondary set 330.2 is formed of documents exhibiting attribute 312 "A", as well as of documents 200 not presenting attribute 312 "A", and therefore coming from other locations than axis 300 "A". Both types of secondary sets 330 can be generated in the same query 210 as the one used to generate the first document set 220, namely the axis 300, or alternatively can be generated in a subsequent query 210 once an axis 300 containing the first set of documents 200 has been generated.

In FIG. 9, documents Bt28 and Ct16 are included in secondary set 330.2 as a result of being referenced by document ABCt10, which in this embodiment is the grouping criterion of secondary set 330.2. In this embodiment, secondary set 330.2 is formed by a mix of documents 200 containing attribute 312 "A" and documents 200 exogenous to the axis 300 "A". However, a secondary set 330 exclusively composed of documents 200 exogenous to the axis 300 is also contemplated within the scope of our work. Likewise, our work also encompasses embodiments where the documents 200 appearing in secondary sets 330, regardless of the type of secondary set 330, could simultaneously be displayed both in the secondary set 330 and on the axis 330 at their intrinsic collation unit 307. Finally, all the documents 200 appearing in FIG. 9 appear as being are stored in the database 32, but it is also contemplated as part of our work that documents 200 included in a secondary set 330 could come from a third party, as could illustratively be the case for documents 200 received via email. Let us now view in turn each of the two preferred embodiments.

Figure 10:
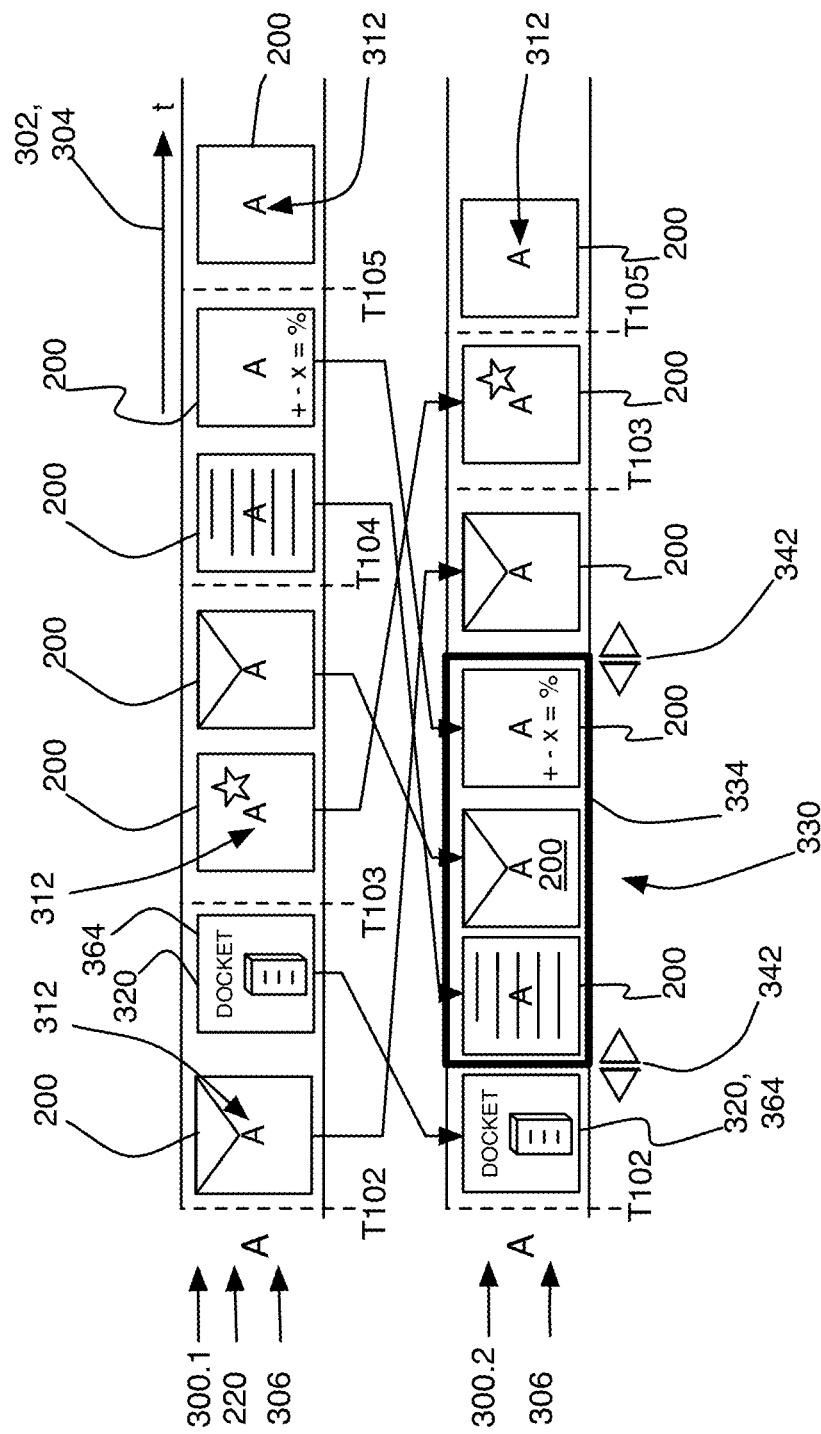
FIG. 10 is a schematic illustration of the generation of a secondary set of documents from a first axis of documents.

FIG. 10 illustrates the process of sorting documents 200 from an axis 300 into secondary sets 330 thereof, according to a grouping criterion. Such secondary sets 330 are thus subsets of the axis 300 by virtue of being entirely composed of documents 200 that are part of the first set or axis 300. On axis 300.1, documents 200 of various types bearing attribute 312 "A" are collated onto the axis 300.1 in chronological order. In this embodiment, both documents 200 that are referenced by docket entry 320 and those that reference docket entry 320 are brought together as a document set 220 on axis 300.2. On axis 300.2, the documents 200 from the axis 300.1 that are linked to docket entry 320 A are grouped together at the same time unit 308 as the docket entry 320, illustratively at time unit 308 T102, while the documents 200 not pertaining to docket entry 320 A are left at their original time unit 308. As is shown in FIG. 10, this means that documents 200 originally located in time units 308 other than T102 are moved to time unit 308 T102. In other words, the grouping criterion of the query 210 overrides single documents 200's intrinsic collation position as specified by its collation value 316.

In FIG. 10, the frame 334 containing the secondary set 330 features sizing arrows 342 which allow the user to make the secondary set 330 take up a smaller or larger proportion of the visible portion of the axis 300.2. Sizing arrows 342 may be embodied as pairs such as in the present embodiment, or as a single sizing arrow 342 allowing the user to expand the secondary set 330's display area 346 in only one direction.

In this embodiment, an informative icon 364 for docket entry 320 and associated document set 220 are placed at the beginning of time unit 308 "T102" once grouped and displayed on axis 300.2. This informative icon 364 representing docket entry 320 is not a document 200 of the same type as the others contained in the document set 220. Rather, the informative icon 364 merely contains metadata, including but not limited to the various references to and from other documents 200, and other parameters such as collation values 316.

The remaining documents 200 from the same time unit 308 on axis 300.1, in this case an email, is positioned after the document set 220. Such an embodiment may be desirable to suit certain user preferences or, for instance, when a large number of documents 200 within each time unit 308 work to make time units 308 large, possibly larger than the display area provided by the axis 300.1 and thus requiring scrolling time. In such occurrences, positioning the secondary set 330 at the beginning of the time unit 308 may help the user find it. Other embodiments could alternatively position the docket entry 320 and related secondary set of documents 330 at the same position as the docket entry 320's position in axis 300.1, with other documents 200 within the same time unit 308 also in their original positions relative to the informative icon 364.

Figure 11:
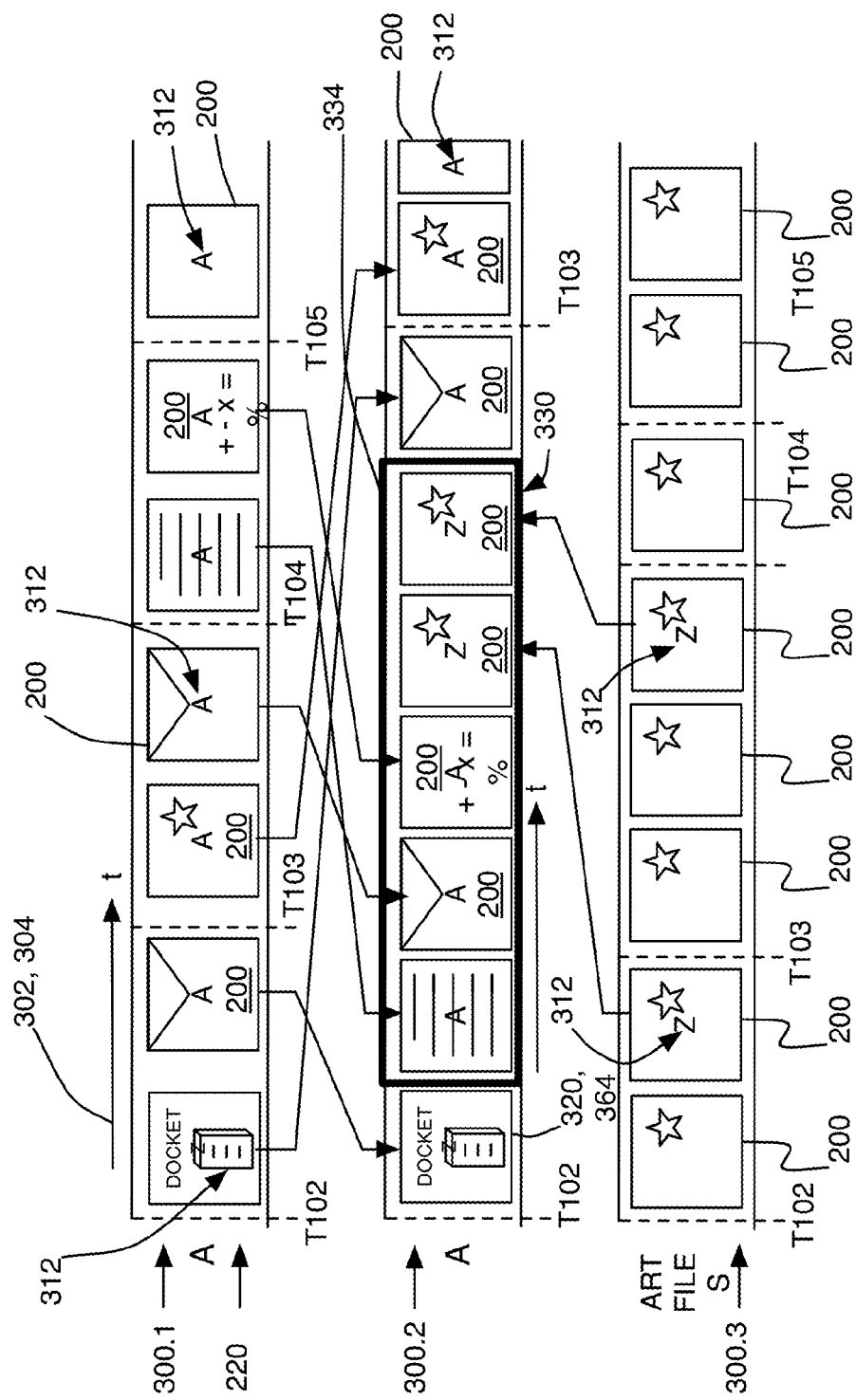
FIG. 11 is a schematic illustration of an alternate embodiment of a secondary set of documents on an axis.

FIG. 11 depicts the second preferred embodiment of the present invention in which secondary sets 330 include documents 200 coming not only from the first document set 220, or axis 300, but also from other sources such as another axis 300 or the database 32. The secondary set 330, unlike in the FIG. 10, is not a subset of the first document set 220. FIG. 11 illustrates an example in which a secondary set 330 is formed to gather together all documents 200 related to docket entry 320 "Z", whether coming from axis 300.1 or from other sources, in this case an axis 300.2 containing all art files (?). Alternatively, the art files pertaining to docket entry 320 "Z" could be located in a database 32 without being organized into a document set 220 prior to selection for the secondary set 330. In the current example however, documents 200 coming from the axis 300.1 that are referenced by or referencing docket entry 320 "Z" are re-organized to become part of the secondary set 330 whereas the art files coming from axis 300.3 become also present in axis 300.2.

Configuring an axis 300 with secondary sets 330 therein, whichever the type of secondary set 330, can be explained by the following expression:

$$\text{Conf}(\text{AXIS}_a) = \langle CS_a, C_a, E_a, VDFs_a, GRPs_a \rangle \qquad \text{Equation 2}$$

whereby
$CS_a$ again represents the filtering criterion applied to all documents 200 in the database 32 to select the documents 200 to be represented on the axis 300;
$C_a$ represents the collation function;
$E_a$ represents the equivalence class for gathering documents 200 into collation units 307;
$VDFs_a$ represents the set of visually distinctive feature(s) 230 applied to documents 200 from the first set; and
$GRPs_a$ represents the set of grouping rules (many grouping sets may be used on the same axis 300).

Visually distinctive features 230 can be defined as graphical means to highlight one or more documents 200 based on a specified attribute. Mathematically, visually distinctive features 230 can further be defined as follows:

$$VDF_{ai} = \langle CS_{ai}, A_{ai} \rangle \qquad \text{Equation 3}$$

whereby
$CS_{ai}$ represents the criterion used to determine which documents 200 or document sets 220 are affected by the VDF; and
$A_{ai}$ represents a description of the visual action to undertake.

Such an action could be described, for instance, by a phrase, such as "shift upward", or "apply red frame", or another mathematical expression. A wide variety of visually distinctive features 230 is contemplated by our work, including but not limited to color, frame, position, shading, etc. In accordance with the present formula, visually distinctive features 230 may optionally be applied to documents 200 within a first document set 220 ($VDF_1$), to documents 200 within a secondary set 330, and/or to an entire secondary set 330. We shall later provide a detailed explanation of visually distinctive features 230 and the various embodiments thereof.

A secondary set 330 (or group) rule can further be defined as follows:

$$GRP_{ai} = \langle CS_{ai}, CG_{ai}, CSG_{ai}, C_{ai}, CV_{aij}, VDFs_{ai}, GRPs_{ai} \rangle \qquad \text{Equation 4}$$

whereby
$CS_{ai}$ is a criterion selection function that determines which documents 200 or attribute 312 will serve as a basis for the creation of secondary sets 330;
$CG_{ai}$ is a criterion of gathering function that receive the criterion of the selection and determines which documents 200 should of the axis 300 should be moved into the secondary set 330;
$CSG_{ai}$ is a supplementary criterion function that receives the criterion of the selection of the group and returns a criterion selection for adding more documents 200 in the secondary set 330 that are not by provided by the filtering criterion of the axis 300.
$C_{ai}$ represents the collation function 302 for the documents within the secondary set 330, which is independent from that of the axis 300;
$CV_{ai}$ is a collation value function that determines the position of the secondary set 330 on the axis 300 by using the criterion of selection and returning a collation value 316 comprised within the collation function 302 of the axis 300;
$VDFs_{ai}$ is the set of visually distinctive features 230 that are selected to apply within the secondary set 330;
$GRPs_{ai}$ is the mathematical set of grouping rules, for further levels of subsidiary document sets 220, in which case the mathematical set would contain another iteration of the grouping function for the tertiary set 360. This mathematical set could also be empty if not further document set 220 is contained within the secondary set 330.

According to the aforementioned function and the criterion selection function $CS_{ai}$ a secondary set 330 may be formed around a specific document 200, information icon, such as is illustrated in the following figures, but may also be formed around any attribute 312 shared by the documents 200 including but not limited to file name and first letter thereof, file type, etc. Furthermore, secondary sets 330 may have a collation function 302 distinct from that of the axis 300. In other words, documents 200 contained in a secondary set 330 may be arranged in an order other than that used for the axis 300. For instance, whereas an axis 300 may present a chronological order, a secondary set 330 may organize the documents 200 therein in alphabetical order or by file type.

To provide an example of how Equation 4 is used on axis 300.2 in FIG. 11, the grouping may be defined where $CS_{A1}$ may be all docket entries 320, $CG_{A1}$ may be all a function returning true on all documents that are referenced by the docket entry of the group and a supplementary criterion function $CSG_{A1}$ is provided to insert art files related to the docket entry 320. The collation value may be the creation date and hour of the docket entry.

The present invention also allows the positioning a secondary set 330 on an axis 300 at a location independent from that of the individual documents 200 contained therein through the use of a collation value $CV_{ai}$ of a secondary set 330 in a query 210. While a secondary set 330 formed, illustratively, around a docket entry 320, may be placed at the date of the docket entry 320, whether before the docket entry 320, instead of it or after it, it may also be positioned elsewhere to suit a variety of purposes. $CV_{aij}$ may therefore correspond to a given collation unit 307, such as a time unit 308 in the case of a chronological collation function 302, to a document 200 that references or is referenced by other documents 200 in the secondary set 330, or to a specific location on the display area, inside or outside the axis 300. For example, a user may wish to view all of his work documents 200 on an axis, but always have, illustratively, their personal photograph files on the left of their screen.

Further to the function described above, FIG. 12 outlines, from a theoretical perspective, the different degrees levels of grouping on axes 300. At grouping degree 0, documents 200 documents 200 bearing attribute 312 "A" disposed on the axis 300.1. At this level, documents 220 could be sorted according to an attribute 312, but no collation function 302 is used. Grouping degree 0 therefore presents no grouping of any kind. At the first grouping degree, documents 200 bearing attribute 312 "A" are disposed in a specified order in collation units 307. Documents 200 having attribute 312 "A" but no collation value 316 are placed to the right of the axis 300.2 outside of the collation. While no secondary set 330 is illustrated here, it is important to note that collation units 307 may themselves constitute a first level of grouping. Likewise, juxtaposing documents 200 presenting no collation value 316 to the right of axis 300.2 also represents a level of grouping. At the second grouping degree, one secondary set 330 is placed on axis 300.3 and identified by a frame 334. This type of grouping is extensively described in the present specification. At the third grouping degree, three secondary sets 330 are shown within axis 300.4. Of these secondary sets 330, secondary set 300.2 is composed of two sets, one of which, a tertiary set 360 is placed within the secondary set 330.2. This tertiary set 360, like secondary set, may be a subset of secondary set 330.2, composed of documents 200 exclusively comprised within secondary set 330.2, or may be a document set 220 composed of documents 200 exogenous to the secondary set 330.2 or the axis 330.4 as a whole. This latter embodiment is displayed here, with a tertiary set 360 formed of a plurality of documents 200 presenting the attribute 312 "B" being integrated in an axis 300.4 exclusively formed of documents 200 presenting the attribute 312 "A". While axis 300.4 illustrates levels of secondary sets 330 going only as far as a tertiary set 360, further levels of subsidiary sets, and therefore grouping degrees, are contemplated by the invention.

Figure 12:
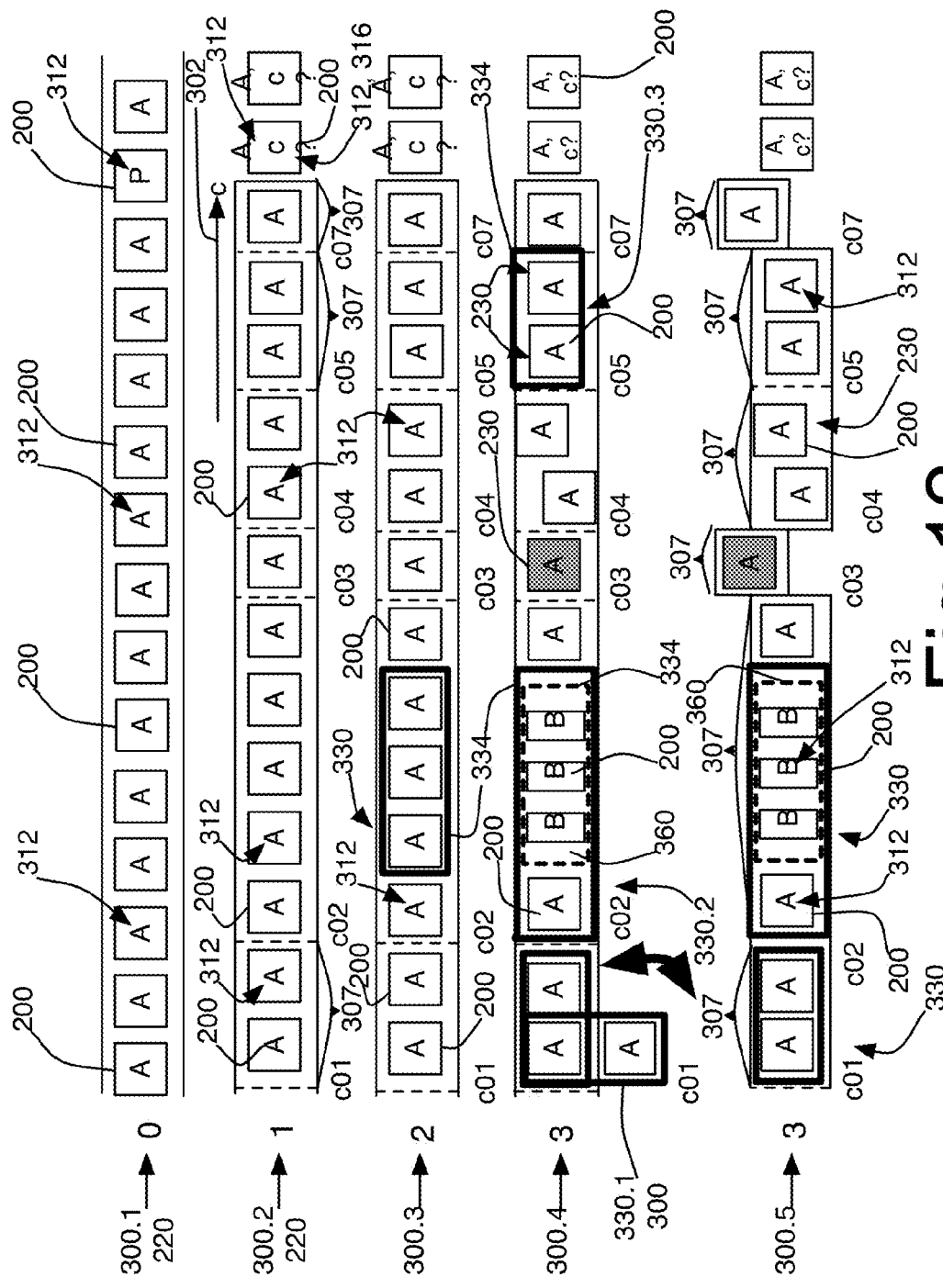
FIG. 12 is a schematic illustration of the various levels of grouping of documents into sets.

In axis 300.4 of FIG. 12, secondary set 330.1 is shown as potentially embodied horizontally or vertically. This embodiment could be offered to the user as a choice, selectable by a variety of means such as clicking, double-clicking, dragging, etc. Upon prompting by a user, the movement of the secondary set 330 from horizontal to vertical or from vertical to horizontal could be embodied in a host of ways. One possible way could be the sliding downward or upward of the secondary set 330 around a rotation axis. Another possible way could be a series of movements comprising, illustratively, the upward or downward collapsing of the secondary set 330 to the beginning of the secondary set 330 and another movement in whereby the secondary set 330 would again be expanded in the direction specified by the user.

One facet of grouping encompasses the notion of visually distinguishing documents 200 and document sets 220. On a basic level, single documents 200 may be represented as having visually distinctive features 230 applied thereon, such as in axis 300.4 of FIG. 12 where shading and vertical shifting (upwardly and downwardly) are used to highlight certain documents 200 and provide additional meaning to the display. While documents are not grouped in spatial terms, this constitutes a kind of grouping. Rather than being based on location or juxtaposition, grouping can be visual. In turn, entire document sets 220 may be highlighted in different ways using visually distinctive features 230 such as is illustrated by secondary set 330.3 on axis 300.4, which is shifted upward in relation to the boundaries of the axis 300.4.

Still in FIG. 12, axis 300.5 represents a third grouping degree axis where, in addition to groups formed from documents 200 and visually distinctive features 230, other groups are formed by applying visually distinctive features 230 to collation units 307. Indeed, in axis 300.5, collation units 307 are indeed treated as secondary sets 330, and may be vertically shifted upward and downward. This could be useful, for instance, if a user wanted to highlight and/or block weekends and holidays on a calendar in order to distinguish them from work days.

Figure 13:
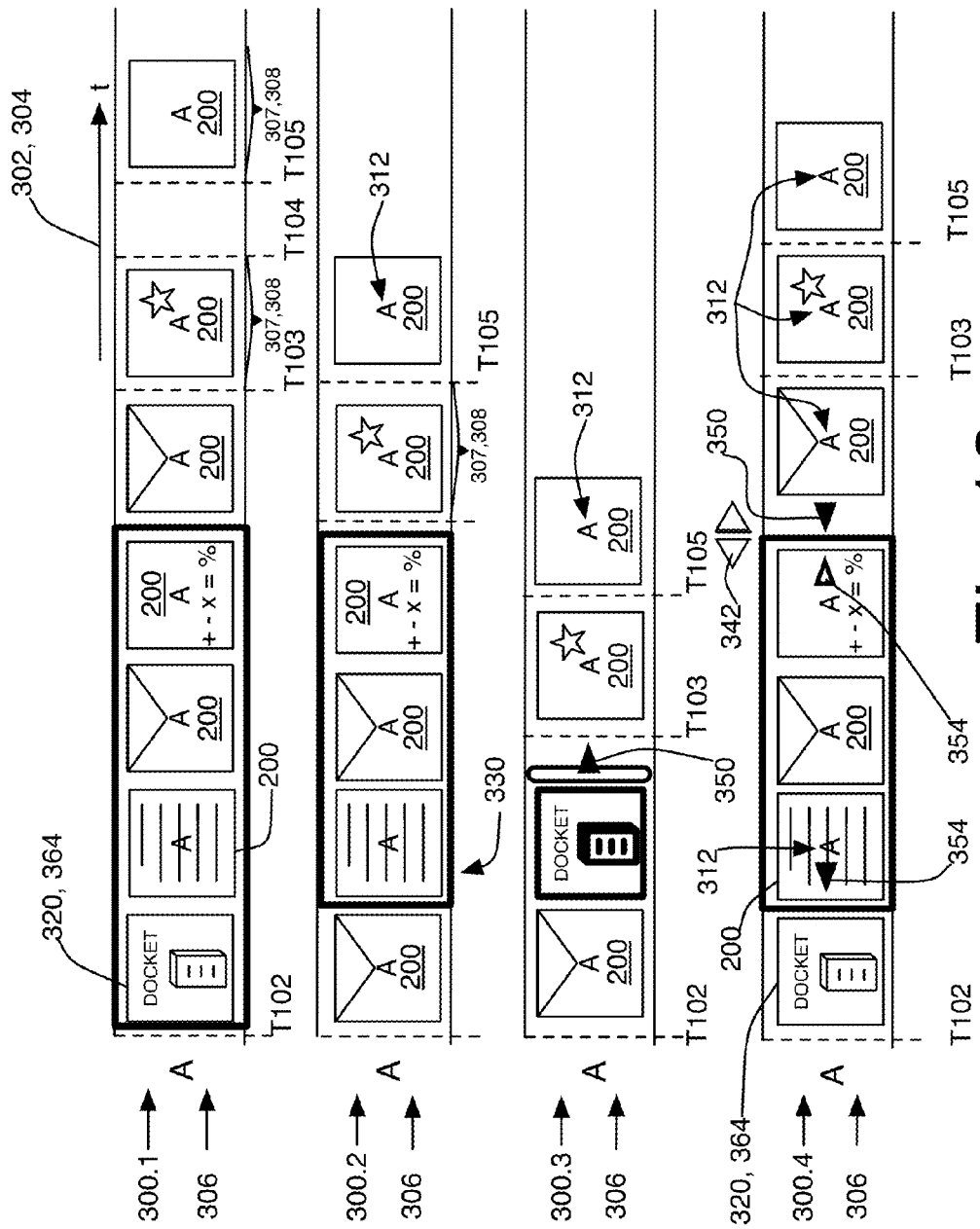
FIG. 13 is a schematic illustration of various embodiments of graphically displaying secondary sets of documents on an axis.

FIG. 13 illustrates different embodiments for graphically rendering document sets 220 placed within axes 300. On axis 300.1, the documents 200 organized as a secondary set 330 around docket entry 320 are highlighted by a frame 334 and placed to the right of an informative icon 364 representing docket entry 320. In this embodiment, the informative icon 364 for docket entry 320 is located within the secondary set of documents 330's frame 334. Whereas secondary sets 330 are scrollable independently of the main axis 300, the docket entry 320 icon could be static at the beginning of the secondary set 330 and as such always be visible, or alternatively be embodied as a scrollable element of the secondary set 330 similar to the documents 200 comprised therein.

Axis 300.2 in FIG. 13 illustrates a secondary set 330 marked by a frame 334 but without any docket entry 320. This embodiment may be desirable for purposes such as leaving greater space for the documents 200 within the secondary set 330 in the set's display area 346.

As is depicted in FIG. 13, grouping documents 200 into a document set 220 in accordance with a shared attribute 312 or reference may mean that certain time units 308 that had documents 200 therein on the initial axis 300 no longer do once grouping has taken place. Therefore some time units 308 may be free of any documents 200. As is shown in FIG. 13, this can be embodied graphically in a variety of ways. Axis 300.1 illustrates a non-linear configuration 306 where time unit 308 "T104" is designated by a blank space between time unit markers 338 "T104" and "T105". Empty time units 308 of varying sizes are contemplated to be within the scope of the present invention to form part of a linear configuration 305 or a non-linear configuration 306. Alternatively, as in illustrated by axes 300.2, 300.3 and 300.4, an empty time unit 308 can be completely collapsed, causing time units markers 338 to go from "T103" directly to "T105".

On axis 300.3, the secondary set 330 generated from the axis 300.3 is collapsed into a small area represented by the informative icon 364. In this embodiment, the documents 200 comprised in the document set 220 are not visible. To expand the display area 346 and the secondary set 330 and make the documents 200 contained therein visible, the user may click on the minimized frame 348 and collapsing arrow 350 located to the right of the informative icon. Such an expanded display area 346 is illustrated in axis 300.4. In this embodiment, a sizing arrow 342 is located to the right of the secondary set display area 346 above axis 300.5. A collapsing arrow 350 is further located to the right of the secondary set 330 display area 346, outside the secondary set 330's frame 334 and inside the axis 300 area. Collapsing arrows 350 located outside the axis 300 area, or to the left of the secondary set 330, or yet pointing vertically rather than horizontally as in the present embodiment are all encompassed by the present invention.

Two scrolling arrows 354 are also positioned inside the secondary set 330 frame 334, indicating bi-directional scrolling functions within the secondary set of documents 330. In this embodiment, different colors for each scrolling arrow 354 indicate the presence or absence of documents 200 in the direction of the scrolling arrow 354. Illustratively, a white scrolling arrow 354 could indicate that the user may scroll to the right to view other documents 200 while a black scrolling arrow 354 pointing leftward may indicate that there are no more documents 200 in the direction of the scrolling arrow. The absence of documents 200 in one direction could alternatively be embodied, for instance, by the absence of a scrolling arrow 354 in the same direction without departing from the present invention. Similarly, a scrolling arrow 354 changing colors as the number of documents 200 available in a given direction decreases is also contemplated within the scope of the instant invention.

Figure 14:
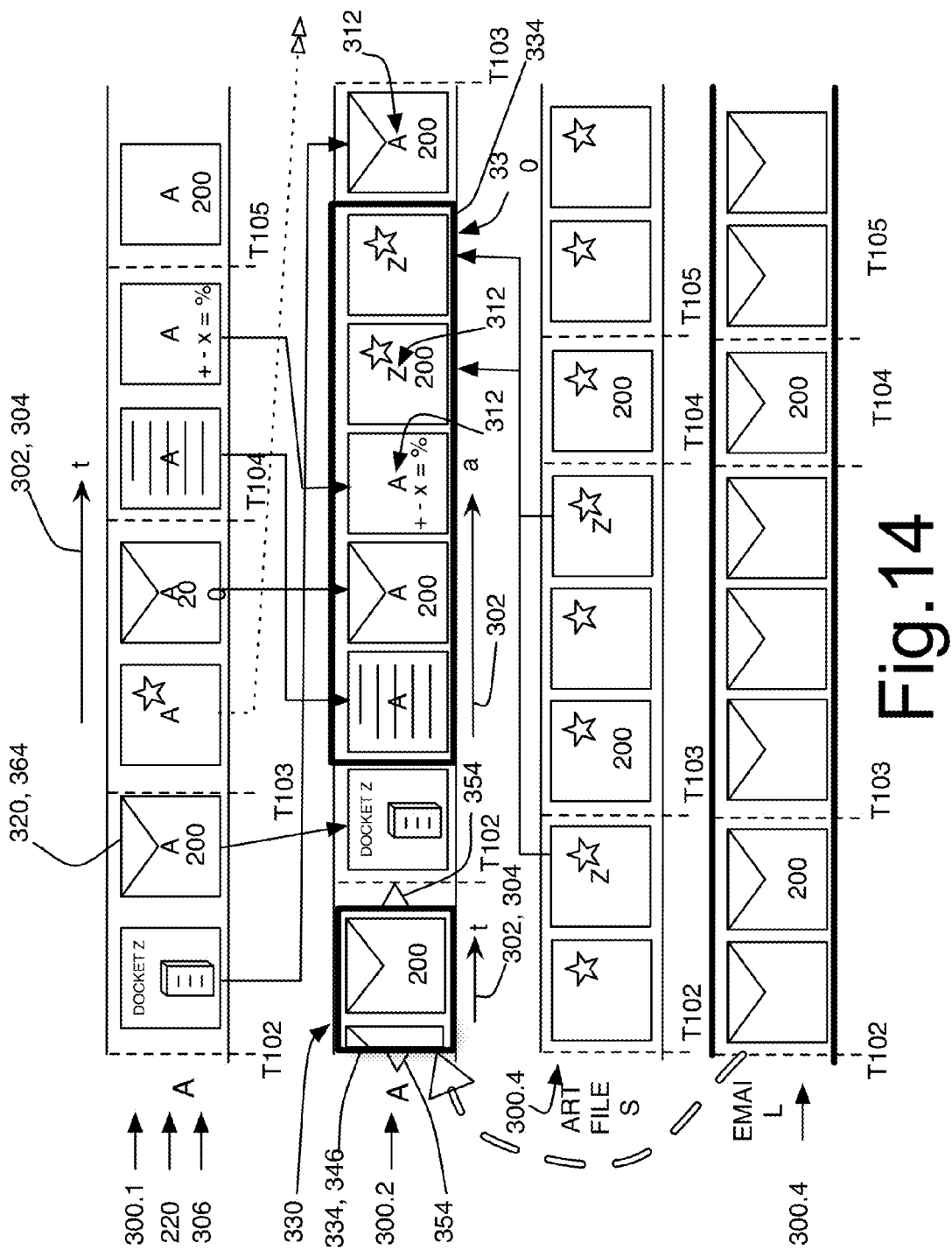
FIG. 14 is a schematic illustration of a plurality of secondary sets positioned within an axis.

In FIG. 14, a secondary set 330 is generated around docket entry 320 "Z" and positioned at the docket entry 320's date of entry, namely T102. The documents 200 contained in this secondary set 330 are taken both from a first axis, axis 300.1, and from an art file axis 300.3, which alternatively, could be contained in the database 32 without being represented on an axis. This secondary set 330 is organized by alphabetical order, unlike the rest of the axis, of which the scale is chronological. In addition, another secondary set 330 is created by minimizing axis 300.4, which is exclusively composed of emails, and integrating it to axis 300.2. However, this second secondary set 330 is not positioned within the collation of axis 300.2, but rather outside of it, at the extreme left of the axis 300.4. This means that upon scrolling the axis 300.2, the secondary set 330 containing emails will remain static. Graphically speaking, this second secondary set 330 is embodied so as to maintain a small display area 346. Scrolling arrows 354 are nonetheless provided to allow users to view email documents 200 as they would be positioned on the axis 300.4 if viewed in full.

Figure 15:
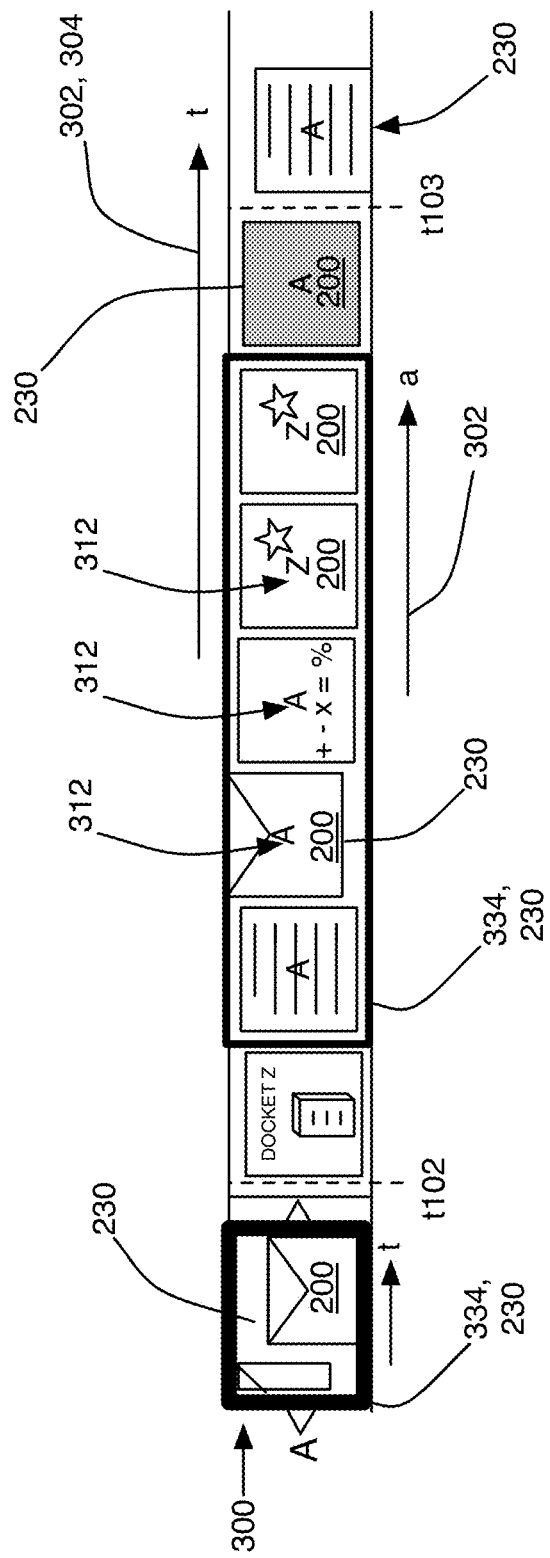
FIG. 15 is a schematic illustration of visually distinctive features applied to documents and sets thereof on an axis.

FIG. 15 illustrates a plurality of visually distinctive features 230 as applied to documents inside and outside sets. As was explained above, visually distinctive features 230 encompass the host of graphical means used to highlight documents 200 or sets thereof 220, which may include but may not be limited to shape, color, shading, frames, etc. is depicted in FIG. 15, visually distinctive features 230 may be applied to documents 200 comprised in the first document set 220. In this figure, one document 200 presents shading and one other document is positioned as resting against the axis 300's lower boundary. This may be used, for instance, to distinguish incoming from outgoing documents 200. This may be deemed useful for certain documents 200 such as email, as is depicted in the secondary set 330 positioned to the left of the axis 300. Frames may also be used to single out certain documents 200, such as is illustrated here. Furthermore, a plurality of visually distinctive features 230 may be applied to the same document 200, as is depicted here with a document that is at once downwardly positioned in relation to the center of the axis 300 and framed. Secondary sets 330 may in turn be represented graphically with different visually distinctive features 230, as is illustrated here by having a first secondary set 330 framed with a thicker line than the other secondary set 330. While line type is used here to distinguish each secondary set 330, a diversity of visually distinctive features 230 could be used without departing from the present invention.

Figure 16:
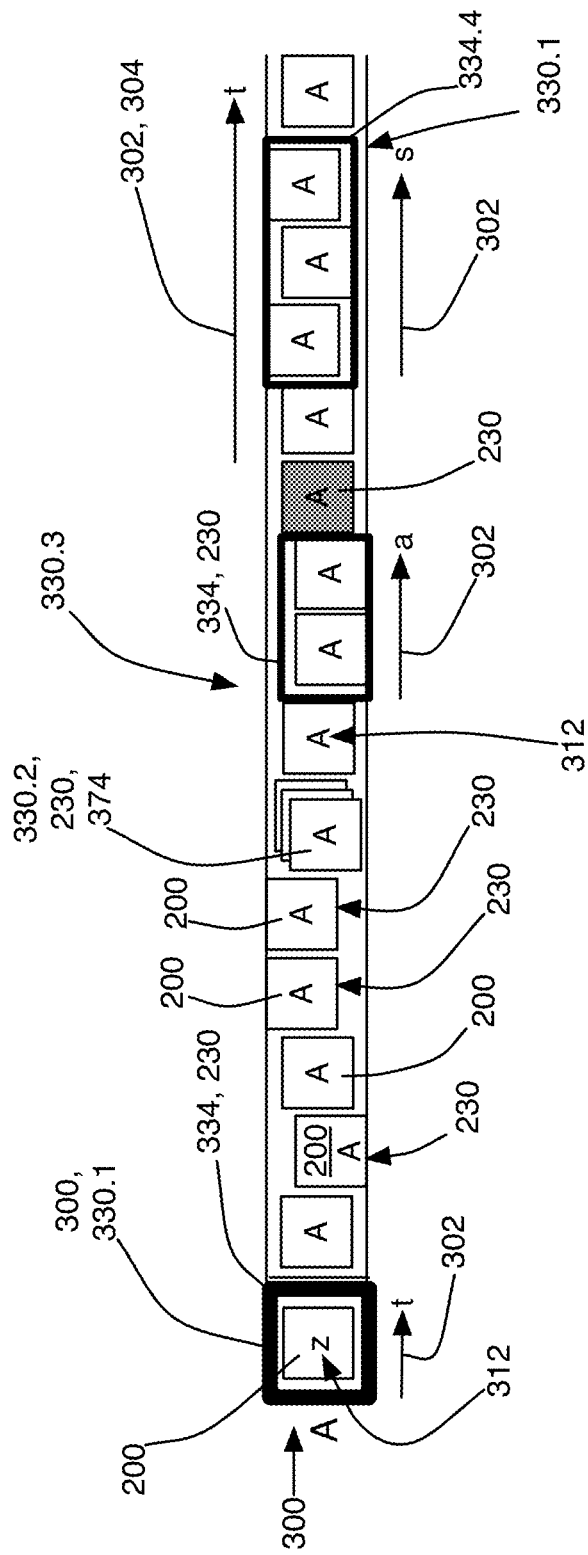
FIG. 16 is a schematic illustration of alternate embodiments of visually distinctive features applied to documents and sets thereof on an axis.

FIG. 16 illustrates an alternate embodiment in which multiple secondary sets 330 are displayed on the same axis 300, with a variety of visually distinctive features 230. Secondary set 330.1, located to the left of the axis 300, is composed of documents 200 containing the attribute 312 "Z", and is located outside the axis 300's collation. Different documents 200 featuring attribute 312 "A" are then represented on axis 300 as not forming any secondary set 330. These documents 200 nevertheless present a plurality of visually distinctive features 230, such as upwardly or downwardly positioning in relation to the axis 300's boundaries, overlapping, or shading. Other visually distinctive features 230 could be applied without departing from the present invention.

Three more secondary sets 330 are also represented on the axis 300. Secondary set 330.2, rather the collection of documents 200 disposed within a frame 334, is embodied as a document pile 374 disposed so as to substantially overlap with one another. Such an embodiment could be useful in making the secondary set more compact and leaving more space for other documents 200 and document sets 220 in the display.

Secondary set 330.3 consists of a collection of documents 200 visually distinguished by a frame 334. In this embodiment, the secondary set 330.3 is downwardly positioned in relation to the axis 300. Conversely, secondary set 330.4 is upwardly positioned in relation to the axis 300's boundaries. Within each of these secondary sets 330, some documents 200 are also downwardly or upwardly positioned in relation to the frame 334.

Figure 17:
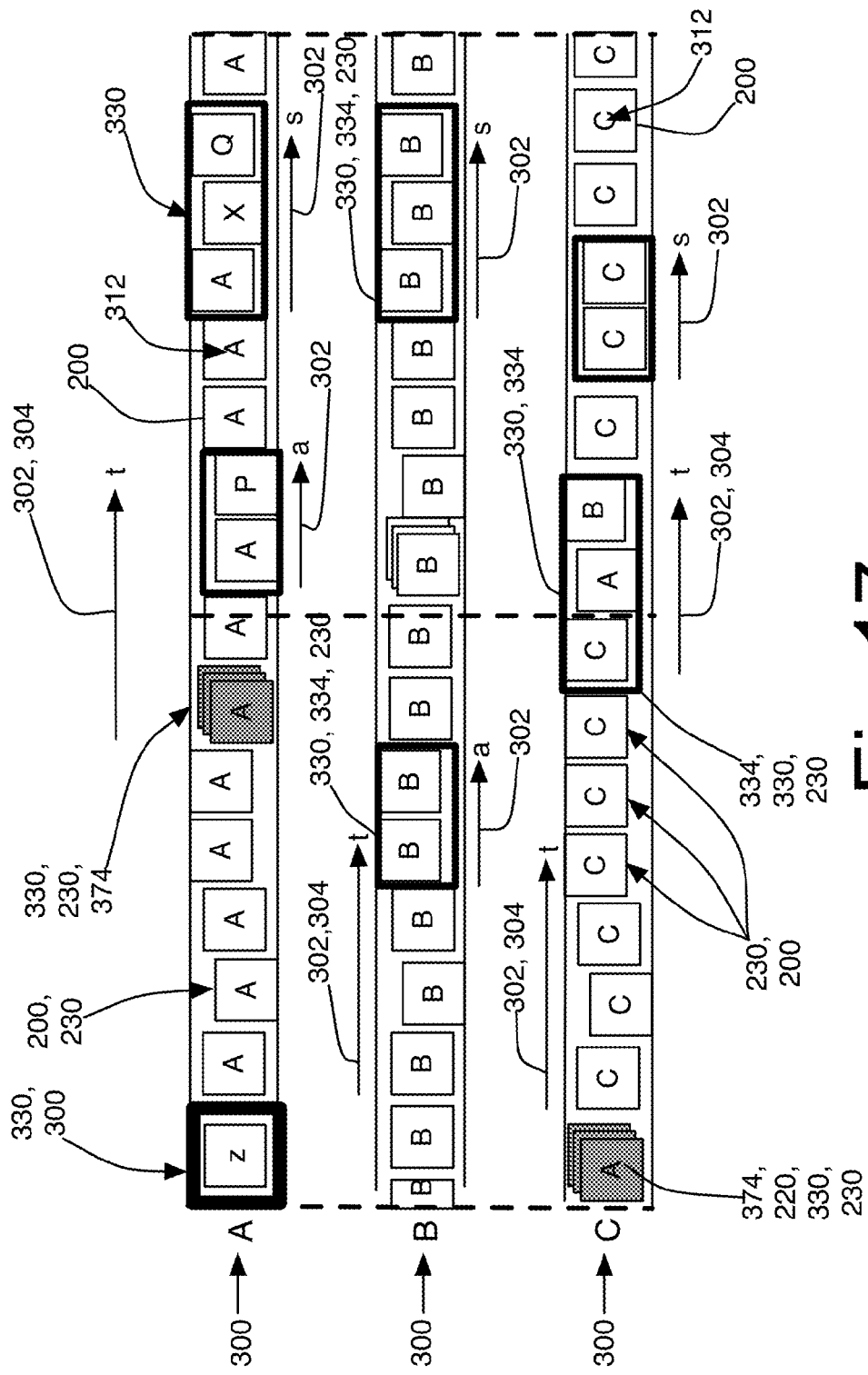
FIG. 17 is a schematic illustration of a group of axes containing multiple sets of documents.

In FIG. 17, three axes 300 are displayed, each containing a plurality of secondary sets 330. Some sets are embodied as document piles 374 while others are disposed within frames 334. Like secondary sets 330, document piles 374 may have visual distinctive features applied on them. The axes 300 of FIG. 17 are shown as self-standing, but could also be grouped to share the same collation function 302, thus forming a matrix 370.

Figure 18:
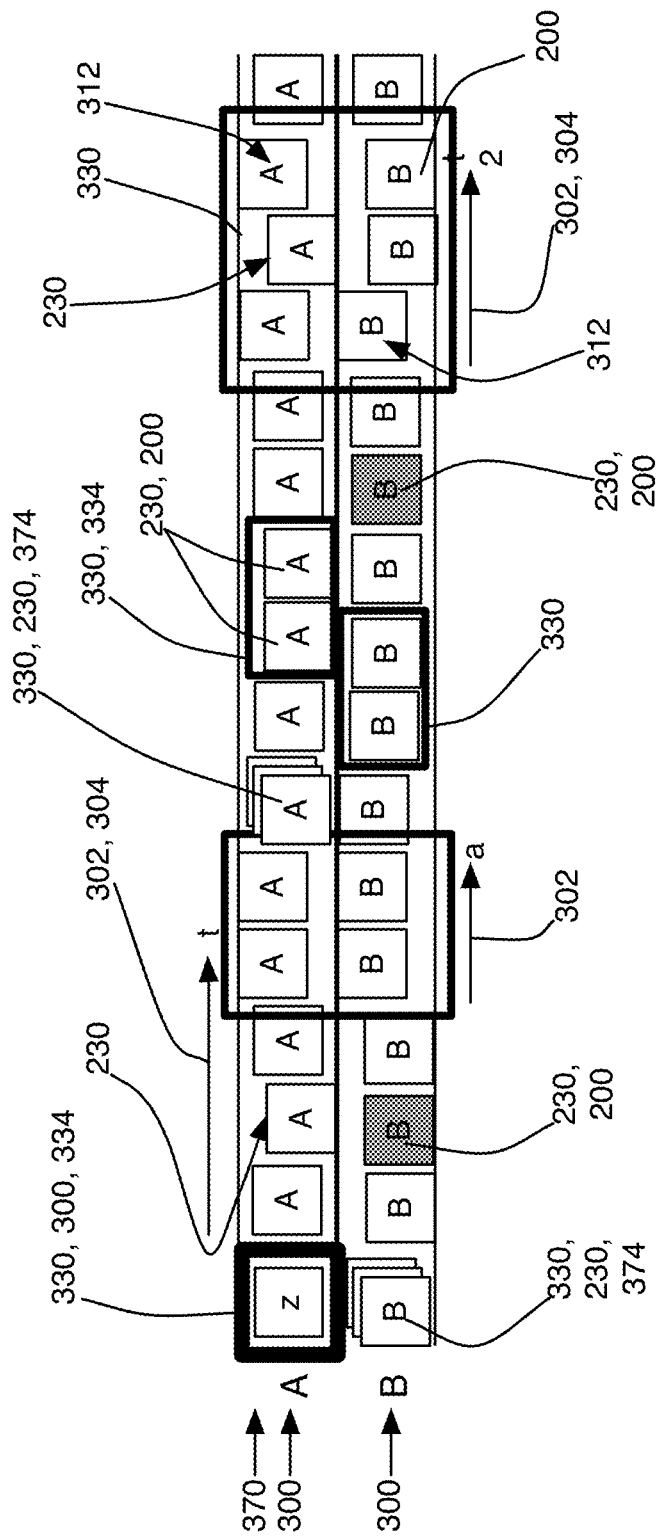
FIG. 18 is a schematic illustration of an alternate embodiment of a group of axes containing multiple sets of documents.

FIG. 18 illustrates an embodiment of a matrix 370 in which grouped axes 300 share the same timeline 304. Secondary sets 330 are represented therein, presenting distinct collation functions 302. In this figure, a plurality of secondary sets 330 is displayed. Among these secondary sets 330, some are contained within one axis 300, whereas others are expanded over both axes 300. This could be useful in order to further sub-divide documents 200 comprised in the secondary set 330 into two distinct parts. For instance, a user may want to group all documents 200 pertaining to docket entry 320 "Z" and keep all art files on the top axis 300 while all other documents 200 would be displayed on the bottom axis 300. While this embodiment shows secondary sets 330 expanded over two axes 300. A secondary set 330 expanded over a plurality of axes may be useful to group the results of a plurality of queries that would have a common collation value. This is shown in FIG. 18 where the two secondary set 330 expanded on the two axes 300 is grouping documents 200 having the "A" attribute with those having the "B" attribute. Secondary sets 330 expanded over more than two axes are contemplated as part of this invention.

Figure 19:
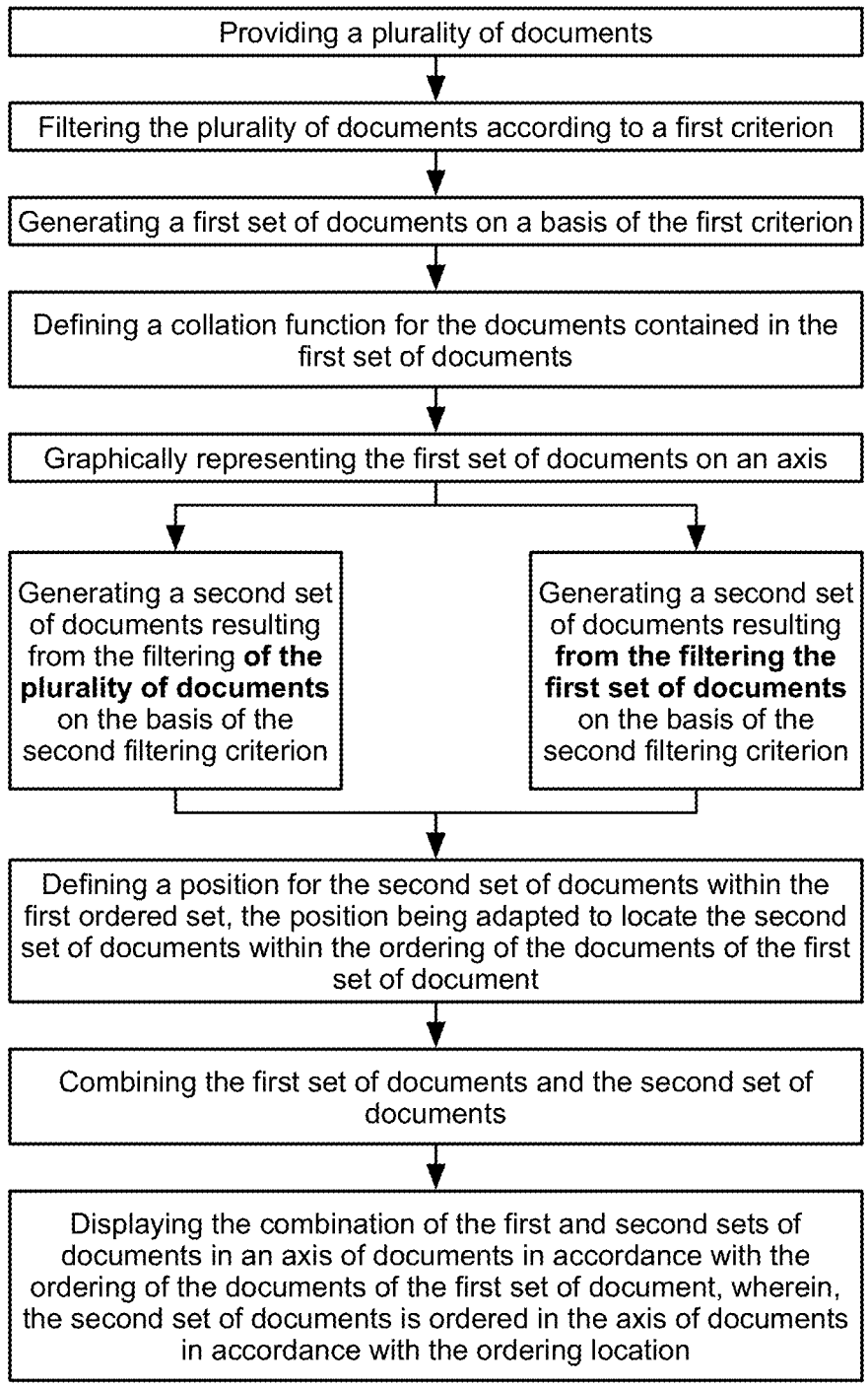
FIG. 19 is a flow chart describing the method for generating sets of documents and positioning them on a unique axis.

FIG. 19 is a flow chart of an exemplary method of creating a hierarchy of document sets 220 and integrating the different document sets 220 into the same axis 300 display. The method first includes providing a plurality of documents, which may be contained in a database 32. Secondly, the method includes filtering the plurality of documents according to a filtering criterion. Thirdly, the method includes generating a first document set 220 from the first filtering criterion. Fourth, the method includes graphically displaying the document set 220 on an axis 300. Fifth, the method includes generating a secondary set 330 of documents 200, either exclusively from the first document set 220 of from the plurality of documents, by using a second filtering criterion. The fifth step also includes defining a collation function for the secondary set. As a sixth step, the method includes defining a position for the secondary set 330 within the first document set 220 as ordered on an axis 300 according to a collation function 302. The seventh step of the method combines the first document set 220 and the secondary set 300. Lastly, the eighth step of the method displays the combined document sets 220 on the same axis 300 in accordance with the position specified previously.

Figure 20:
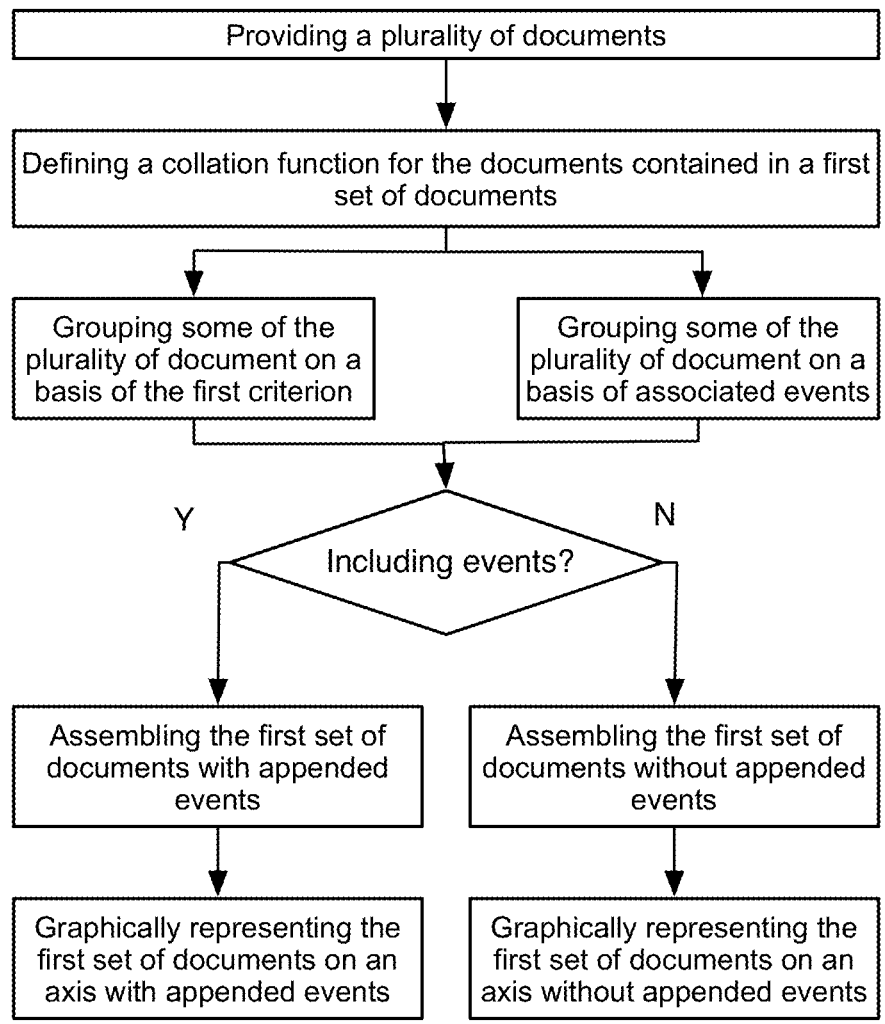
FIG. 20 is a flow chart describing the method for including or not including events in a secondary set of documents and graphically displaying the same.

FIG. 20 is a flow chart describing the method for including or not including events in a secondary set of documents and graphically displaying the same.

Figure 21:
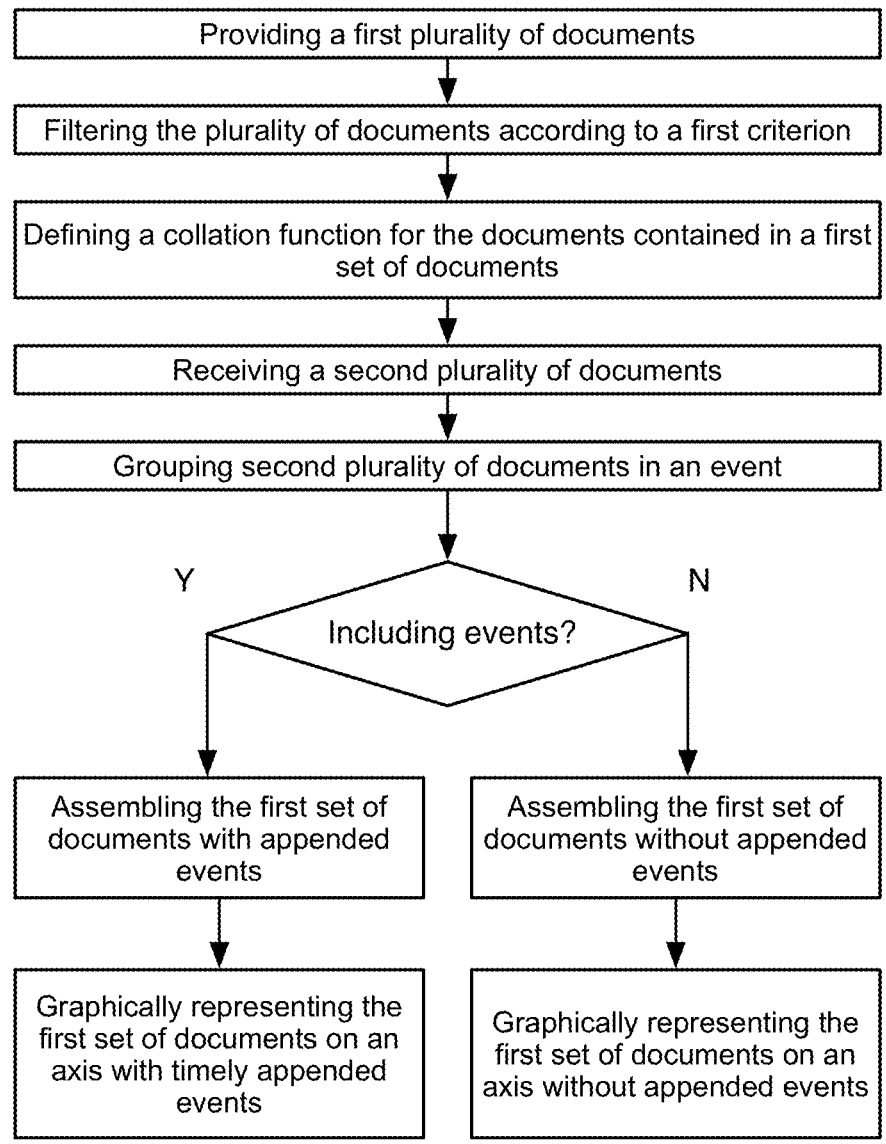
FIG. 21 is a flow chart describing the method for integrating secondary document sets to an axis when said document set is exogenous to the query.

FIG. 21 is a flow chart describing the method for integrating secondary document sets to an axis when said document set is exogenous to the query.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-readable instructions that, when executed by a processor of a computer system, cause the computer system to perform operations for displaying an array of time-stamped user-selectable elements on a display, the operations comprising:
    selecting a first set of user-selectable elements on a basis of a first filtering criterion;
    using a first chronological order for ordering the selected first set of user-selectable elements;
    selecting a second set of user-selectable elements on a basis of an association with a reference computer-readable element from the first set of user-selectable elements;
    selecting an ordering of the second set of user-selectable elements;
    identifying a position along the ordering of the first set of user-selectable elements for locating and interleaving the second set of user-selectable elements within the first set of user-selectable elements along the axis of user-selectable elements in conjunction with the reference user-selectable element from the first chronologically ordered set of user-selectable elements; and
    displaying a combined set of user-selectable elements including the first set of user-selectable elements and the interleaved second set of user-selectable elements in an axis of user-selectable elements displaying the user-selectable elements in a single line of user-selectable elements disposed in a substantially rectilinear formation corresponding with the first chronological order, the first set of user-selectable elements being ordered on a basis of the first chronological order, wherein the second set of user-selectable elements is displayed on a basis of the identified position along the first ordered set of user-selectable elements in graphical juxtaposition with the reference user-selectable element, the second set of time-stamped user-selectable elements being anachronically ordered in respect with the first chronological order of the first set of user-selectable elements.

2. The non-transitory computer-readable medium of claim 1, wherein at least some of the user-selectable elements are computer-readable files including a plurality of file formats.

3. The non-transitory computer-readable medium of claim 1, wherein at least some of the user-selectable elements are user-selectable icons.

4. The non-transitory computer-readable medium of claim 1, wherein the second set of user-selectable elements is adapted to be ordered on a basis of a collation function.

5. The non-transitory computer-readable medium of claim 4, wherein the collation function is a second chronological order.

6. The non-transitory computer-readable medium of claim 1, wherein at least some of the user-selectable elements are documents.

7. The non-transitory computer-readable medium of claim 1, wherein the identified position is chronologically after the reference user-selectable element.

8. The non-transitory computer-readable medium of claim 1, wherein the second set of user-selectable elements is axially collapsible.

9. The non-transitory computer-readable medium of claim 1, wherein a visual distinctive feature is adapted to be applied to the second set of user-selectable elements to further distinguish the second set of user-selectable elements from the first set of user-selectable elements.

10. The non-transitory computer-readable medium of claim 1, wherein the second set of user-selectable elements is adapted to be displayed at an angle in respect with the axis of user-selectable elements.

11. A computerized system configured to read computer-executable instructions adapted to enable a program enabling an interface adapted to order and display computer-readable files, the computerized system comprising:
    a processing unit configured to process the computer executable instructions; and
    a display configured to display the interface;
    the program, when executed, being operative to:
    select a first set of user-selectable elements on a basis of a first filtering criterion;
    using a first chronological order for ordering the selected first set of user-selectable elements;
    select a second set of user-selectable elements on a basis of an association with a reference computer-readable element from the first set of user-selectable elements;
    select and ordering of the second set of user-selectable elements;

identify a position along the ordering of the first set user-selectable elements for locating and interleaving the second set of user-selectable elements within the first set of user-selectable elements along the axis of user-selectable elements in conjunction with the reference user-selectable element from the first chronologically ordered set of user-selectable elements; and display a combined set of user-selectable elements including of the first set of user-selectable elements and the interleaved second set of user-selectable elements in an axis of user-selectable elements displaying the user-selectable elements in a single line of user-selectable elements disposed in a substantially rectilinear formation corresponding with the first chronological order, the first set of user-selectable elements being ordered on a basis of the first chronological order, wherein the second set of user-selectable elements is displayed on a basis of the identified position along the first ordered set of user-selectable elements in graphical juxtaposition with the reference user-selectable element, the second set of time-stamped user-selectable elements being anachronically ordered in respect with the first chronological order of the first set of user-selectable elements.

12. The computerized system of claim 11, wherein at least some of the user-selectable elements are user-selectable icons.

13. The computerized system of claim 11, wherein the second set of computer-readable files is adapted to be ordered on a basis of a second collation function.

14. The computerized system of claim 11, wherein at least some of the user-selectable elements are documents.

15. The computerized system of claim 11, wherein the identified position is chronologically after the reference user-selectable element.

16. The computerized system of claim 11, wherein the second set of user-selectable elements is axially collapsible.

17. The computerized system of claim 11, wherein a visual distinctive feature is adapted to be applied to user-selectable elements to further distinguish user-selectable elements from the first set of user-selectable elements.

18. The computerized system of claim 11, wherein the second set of user-selectable elements is adapted to be displayed at an angle in respect with the axis of user-selectable elements.

19. A method of combining a plurality of sets of documents on a display, the method comprising:
    selecting a first set of user-selectable elements on a basis of a first filtering criterion;
    selecting a second set of user-selectable elements on a basis of an association with a reference computer-readable element from the first set of user-selectable elements;
    selecting an ordering of the second set of user-selectable elements;
    identifying a position along the chronological order of the first set of user-selectable elements for locating and interleaving the second set of user-selectable elements within the first set of user-selectable elements on an axis of user-selectable elements in conjunction with the reference user-selectable element from the first chronologically ordered set of user-selectable elements;
    displaying and ordering the first set of user-selectable elements in accordance with an order defined on a basis of a first collation function; and
    displaying a combined set of user-selectable elements including of the first set of user-selectable elements and the interleaved second set of user-selectable elements on the axis of user-selectable elements displaying the user-selectable elements in a single line of user-selectable elements disposed in a substantially rectilinear formation corresponding with the first chronological order, the first set of user-selectable elements being ordered on a basis of the first chronological order wherein the second set of user-selectable elements is displayed on a basis of the identified position along the first ordered set of user-selectable elements in graphical juxtaposition with the reference user-selectable element, the user-selectable elements of the second set of time-stamped user-selectable elements being anachronically ordered in respect with the first chronological order of the first set of user-selectable elements.

20. The method of claim 19, wherein at least some of user-selectable elements are user-selectable icons.

* * * * *